United States Patent
Windh et al.

(10) Patent No.: US 11,829,758 B2
(45) Date of Patent: *Nov. 28, 2023

(54) PACKING CONDITIONAL BRANCH OPERATIONS

(71) Applicant: Micron Technology, Inc., Boise, ID (US)

(72) Inventors: Skyler Arron Windh, McKinney, TX (US); Gongyu Wang, Wellesley, MA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/120,532

(22) Filed: Mar. 13, 2023

(65) Prior Publication Data

US 2023/0214219 A1    Jul. 6, 2023

Related U.S. Application Data

(63) Continuation of application No. 17/399,878, filed on Aug. 11, 2021, now Pat. No. 11,604,650.

(51) Int. Cl.
*G06F 9/30* (2018.01)
*G06F 9/38* (2018.01)
*G06F 8/41* (2018.01)

(52) U.S. Cl.
CPC ........ *G06F 9/30058* (2013.01); *G06F 8/4441* (2013.01); *G06F 8/451* (2013.01);
(Continued)

(58) Field of Classification Search
CPC .... G06F 9/30058; G06F 8/4441; G06F 8/451; G06F 9/30036; G06F 9/3004; G06F 9/3838
See application file for complete search history.

(56) References Cited

U.S. PATENT DOCUMENTS

| 8,122,229 B2 | 2/2012 | Wallach et al. |
| 8,156,307 B2 | 4/2012 | Wallach et al. |

(Continued)

FOREIGN PATENT DOCUMENTS

| CN | 115705213 A | 2/2023 |
| WO | WO-2010051167 A1 | 5/2010 |

(Continued)

OTHER PUBLICATIONS

"Smith-Waterman algorithm", [Online]. Retrieved from the Internet: <URL: https://en.wikipedia.org/wiki/Smith%E2%80%93Waterman_algorithm>, (accessed on Feb. 22, 2022), 9 pgs.

(Continued)

*Primary Examiner* — Phillip H Nguyen
(74) *Attorney, Agent, or Firm* — Schwegman Lundberg & Woessner, P.A.

(57) ABSTRACT

Disclosed in some examples, are systems, methods, devices, and machine readable mediums which use improved dynamic programming algorithms to pack conditional branch instructions. Conditional code branches may be modeled as directed acyclic graphs (DAGs) which have a topological ordering. These DAGs may be used to construct a dynamic programming table to find a partial mapping of one path onto the other path using dynamic programming algorithms.

20 Claims, 14 Drawing Sheets

(52) U.S. Cl.
CPC ........ *G06F 9/3004* (2013.01); *G06F 9/30036* (2013.01); *G06F 9/3838* (2013.01)

(56) References Cited

U.S. PATENT DOCUMENTS

| | | | |
|---|---|---|---|
| 8,205,066 B2 | 6/2012 | Brewer et al. |
| 8,423,745 B1 | 4/2013 | Brewer |
| 8,561,037 B2 | 10/2013 | Brewer et al. |
| 9,710,384 B2 | 7/2017 | Wallach et al. |
| 9,992,219 B1 | 6/2018 | Hamlet et al. |
| 10,990,391 B2 | 4/2021 | Brewer |
| 10,990,392 B2 | 4/2021 | Brewer |
| 2008/0270708 A1 | 10/2008 | Warner et al. |
| 2012/0079177 A1 | 3/2012 | Brewer et al. |
| 2013/0332711 A1 | 12/2013 | Leidel et al. |
| 2014/0310813 A1 | 10/2014 | Murthy |
| 2015/0143350 A1 | 5/2015 | Brewer |
| 2015/0206561 A1 | 7/2015 | Brewer et al. |
| 2016/0063388 A1 | 3/2016 | Mizutani |
| 2019/0042214 A1 | 2/2019 | Brewer |
| 2019/0171604 A1 | 6/2019 | Brewer |
| 2019/0243700 A1 | 8/2019 | Brewer |
| 2019/0303154 A1 | 10/2019 | Brewer |
| 2019/0324928 A1 | 10/2019 | Brewer |
| 2019/0340019 A1 | 11/2019 | Brewer |
| 2019/0340020 A1 | 11/2019 | Brewer |
| 2019/0340023 A1 | 11/2019 | Brewer |
| 2019/0340024 A1 | 11/2019 | Brewer |
| 2019/0340027 A1 | 11/2019 | Brewer |
| 2019/0340035 A1 | 11/2019 | Brewer |
| 2019/0340154 A1 | 11/2019 | Brewer |
| 2019/0340155 A1 | 11/2019 | Brewer |
| 2021/0055964 A1 | 2/2021 | Brewer |
| 2021/0064374 A1 | 3/2021 | Brewer |
| 2021/0064435 A1 | 3/2021 | Brewer |
| 2021/0073285 A1 | 3/2021 | Hunter |
| 2021/0073647 A1 | 3/2021 | Hunter |
| 2021/0149600 A1 | 5/2021 | Brewer |
| 2023/0052450 A1 | 2/2023 | Windh et al. |

FOREIGN PATENT DOCUMENTS

| | | |
|---|---|---|
| WO | WO-2013184380 A2 | 12/2013 |
| WO | WO-2019191740 A1 | 10/2019 |
| WO | WO-2019191742 A1 | 10/2019 |
| WO | WO-2019191744 A1 | 10/2019 |
| WO | WO-2019217287 A1 | 11/2019 |
| WO | WO-2019217295 A1 | 11/2019 |
| WO | WO-2019217324 A1 | 11/2019 |
| WO | WO-2019217326 A1 | 11/2019 |
| WO | WO-2019217329 A1 | 11/2019 |
| WO | WO-2019089816 A3 | 4/2020 |

OTHER PUBLICATIONS

"Understanding Partial Order Alignment forMultiple Sequence Alignment", [Online]. Retrieved from the Internet: <URL: https://simpsonlab.github.io/2015/05/01/understanding-poa/>, (May 1, 2015), 11 pgs.

Melani, et al., "Schedulability Analysis of Conditional Parallel Task Graphs in Multicore Systems", (2017).

Srivastava, Abhishek Kumar, "Function Embedding Generation Using Program Dependency Graph Based Neural Network", (2018).

PACKING CONDITIONAL BRANCH OPERATIONS

PRIORITY APPLICATION

This application is a continuation of U.S. application Ser. No. 17/399,878, filed Aug. 11, 2021, which is incorporated herein by reference in its entirety.

BACKGROUND

Various computer architectures, such as the Von Neumann architecture, conventionally use a shared memory for data, a bus for accessing the shared memory, an arithmetic unit, and a program control unit. However, moving data between processors and memory can require significant time and energy, which in turn can constrain performance and capacity of computer systems. In view of these limitations, new computing architectures and devices are desired to advance computing performance beyond the practice of transistor scaling (i.e., Moore's Law).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
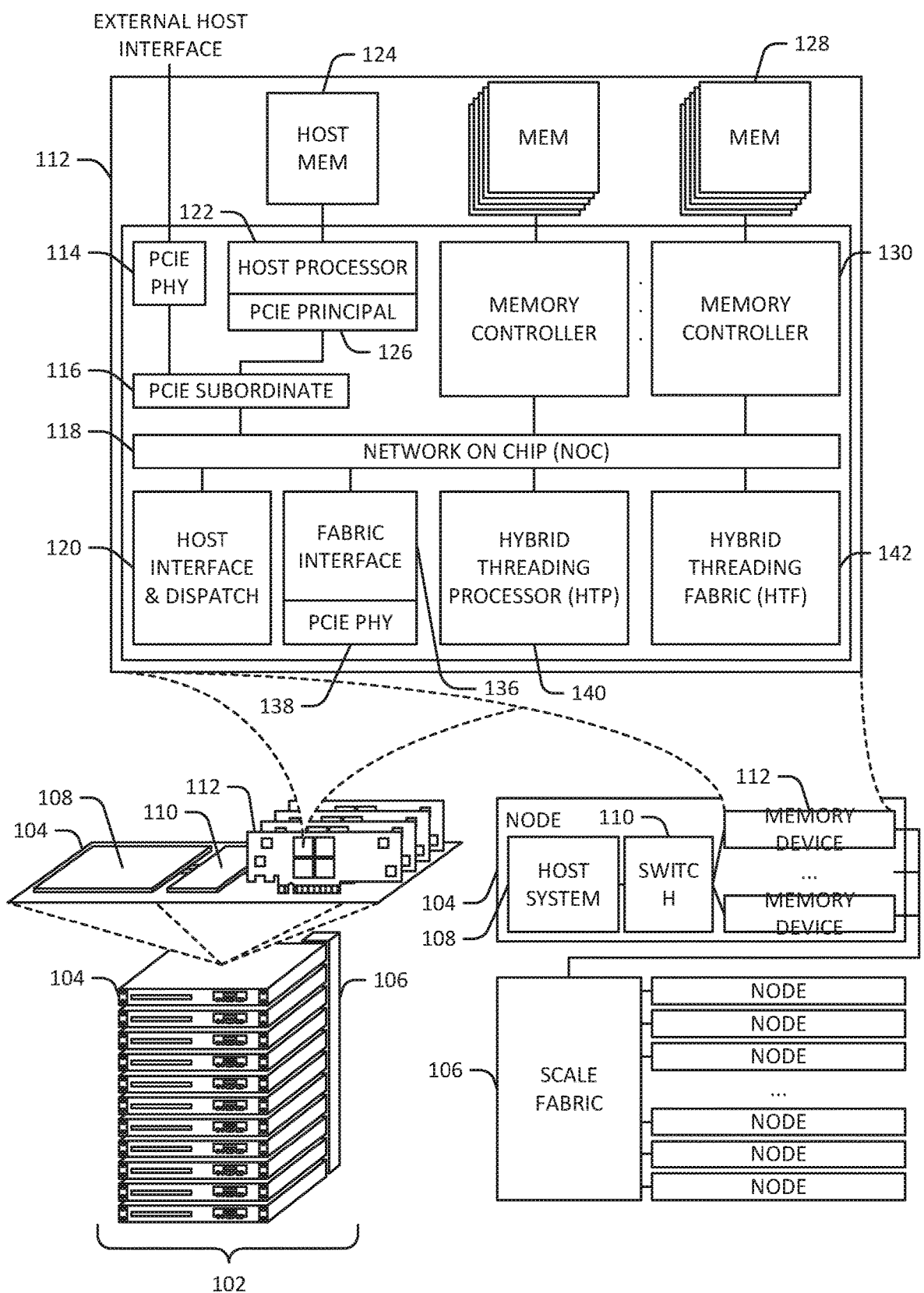
FIG. 1 illustrates generally a first example of a first memory-compute device in the context of a memory-compute system, according to an embodiment.

Recent advances in materials, devices, and integration technology, can be leveraged to provide memory-centric compute topologies. Such topologies can realize advances in compute efficiency and workload throughput, for example, for applications constrained by size, weight, or power requirements. The topologies can be used to facilitate low-latency compute near, or inside of, memory or other data storage elements. The approaches can be particularly well-suited for various compute-intensive operations with sparse lookups, such as in transform computations (e.g., fast Fourier transform computations (FFT)), or in applications such as neural networks or artificial intelligence (AI), financial analytics, or simulations or modeling such as for computational fluid dynamics (CFD), Enhanced Acoustic Simulator for Engineers (EASE), Simulation Program with Integrated Circuit Emphasis (SPICE), and others.

Systems, devices, and methods discussed herein can include or use memory-compute systems with processors, or processing capabilities, that are provided in, near, or integrated with memory or data storage components. Such systems are referred to generally herein as compute-near-memory (CNM) systems. A CNM system can be a node-based system with individual nodes in the systems coupled using a system scale fabric. Each node can include or use specialized or general purpose processors, and user-accessible accelerators, with a custom compute fabric to facilitate intensive operations, particularly in environments where high cache miss rates are expected.

In an example, each node in a CNM system can have a host processor or processors. Within each node, a dedicated hybrid threading processor can occupy a discrete endpoint of an on-chip network. The hybrid threading processor can have access to some or all of the memory in a particular node of the system, or a hybrid threading processor can have access to memories across a network of multiple nodes via the system scale fabric. The custom compute fabric, or hybrid threading fabric, at each node can have its own processor(s) or accelerator(s) and can operate at higher bandwidth than the hybrid threading processor. Different nodes in a compute-near-memory system can be differently configured, such as having different compute capabilities, different types of memories, different interfaces, or other differences. However, the nodes can be commonly coupled to share data and compute resources within a defined address space.

In an example, a compute-near-memory system, or a node within the system, can be user-configured for custom operations. A user can provide instructions using a high-level programming language, such as C/C++, that can be compiled and mapped directly into a dataflow architecture of the system, or of one or more nodes in the CNM system. That is, the nodes in the system can include hardware blocks (e.g., memory controllers, atomic units, other customer accelerators, etc.) that can be configured to directly implement or support user instructions to thereby enhance system performance and reduce latency.

In an example, a compute-near-memory system can be particularly suited for implementing a hierarchy of instructions and nested loops (e.g., two, three, or more, loops deep, or multiple-dimensional loops). A standard compiler can be used to accept high-level language instructions and, in turn, compile directly into the dataflow architecture of one or more of the nodes. For example, a node in the system can include a hybrid threading fabric accelerator. The hybrid threading fabric accelerator can execute in a user space of the CNM system and can initiate its own threads or sub-threads, which can operate in parallel. Each thread can map to a different loop iteration to thereby support multi-dimensional loops. With the capability to initiate such nested loops, among other capabilities, the CNM system can realize significant time savings and latency improvements for compute-intensive operations.

Figure 6A:
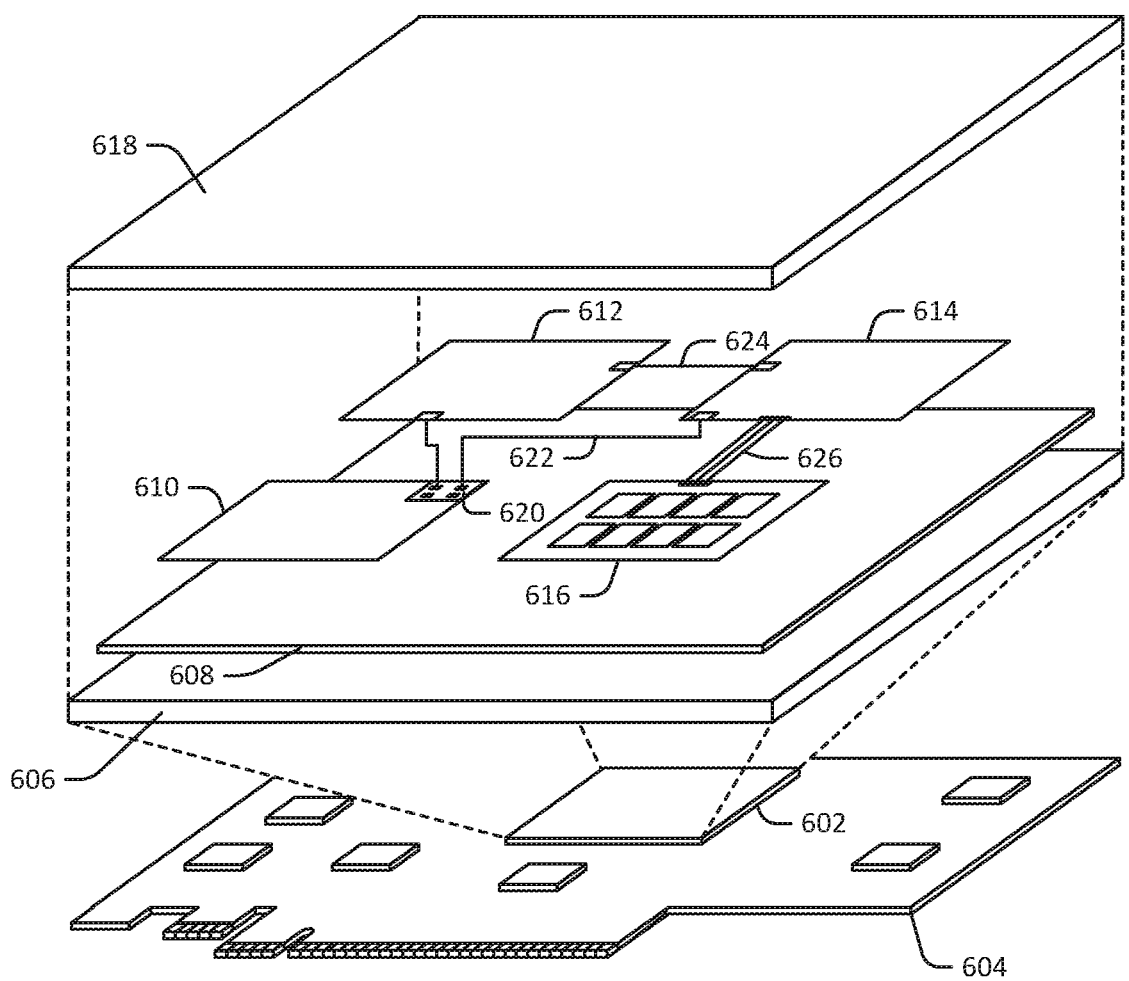
FIG. 6A illustrates generally an example of a chiplet system, according to an embodiment.
Figure 6B:
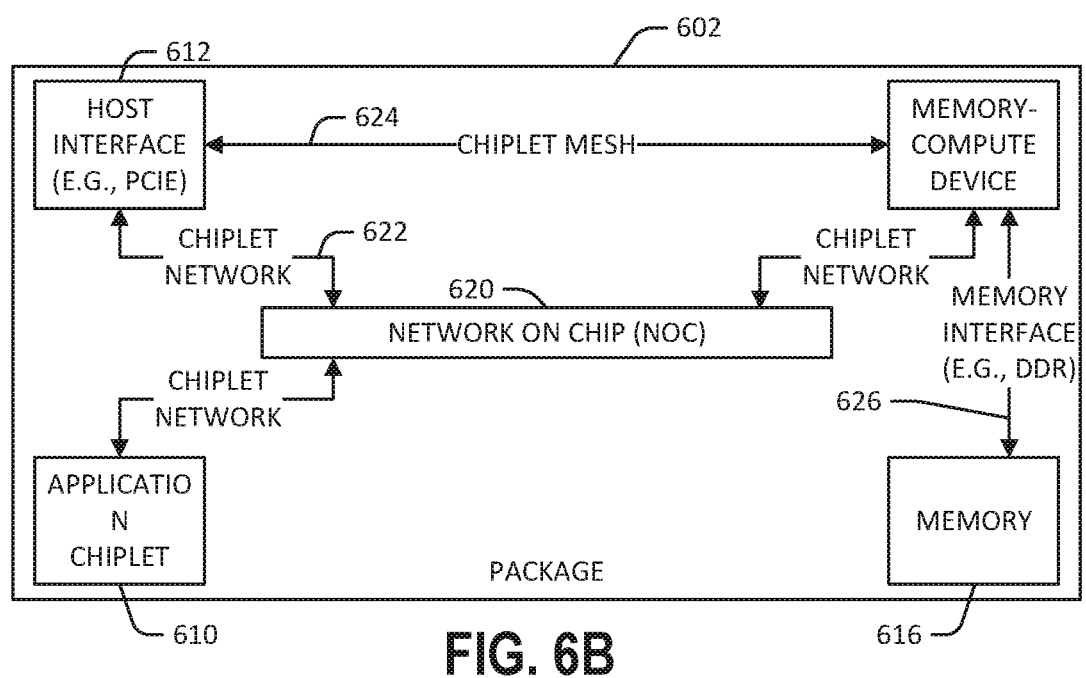
FIG. 6B illustrates generally a block diagram showing various components in the chiplet system from the example of FIG. 6A.

A compute-near-memory system, or nodes or components of a compute-near-memory system, can include or use various memory devices, controllers, and interconnects, among other things. In an example, the system can comprise various interconnected nodes and the nodes, or groups of nodes, can be implemented using chiplets. Chiplets are an emerging technique for integrating various processing functionality. Generally, a chiplet system is made up of discrete chips (e.g., integrated circuits (ICs) on different substrate or die) that are integrated on an interposer and packaged together. This arrangement is distinct from single chips (e.g., ICs) that contain distinct device blocks (e.g., intellectual property (IP) blocks) on one substrate (e.g., single die), such as a system-on-a-chip (SoC), or discretely packaged devices integrated on a board. In general, chiplets provide production benefits than single die chips, including higher yields or reduced development costs. FIG. 6A and FIG. 6B, discussed below, illustrate generally an example of a chiplet system such as can comprise a compute-near-memory system.

As noted, a CNM system may include a data flow architecture. The dataflow architecture encodes a program by laying out instructions over a two-dimensional array of tiles. To support conditional instructions, every ALU operation also outputs a condition code that the tile control logic can operate on. When the main path of execution would execute the ith instruction in the instruction RAM, when the condition code is false the control will select the ith+1 instruction instead. For this scheme to work efficiently, the program needs to be scheduled such that operations on the true branch are paired with operations on the false branch in time slots where enough hardware resources are available for either operation. This invention describes methods for efficiently solving this packing problem.

Disclosed in some examples, are systems, methods, devices, and machine readable mediums which use improved dynamic programming algorithms to pack conditional branch instructions. Conditional code branches may be modeled as directed acyclic graphs (DAGs) which have a topological ordering. These DAGs may be used to construct a dynamic programming table to find a mapping of one path onto the other path using dynamic programming algorithms. This mapping may be used to pack instructions for execution by the dataflow processors.

Traditional dynamic programming algorithms such as the Smith-Waterman algorithm, are designed to find commonalities in string sequences but do not work on DAGs as they assume a single predecessor character at each step or one or more gaps. In a DAG, each node can have multiple predecessor nodes and may not be contiguous. That is, node x+1 might not share a path with node x.

For example, the Smith-Waterman algorithm is used to perform local sequence alignment for two character strings. In the Smith-Waterman algorithm, a scoring matrix is built with columns representing characters in the first sequence and rows representing characters in the second sequence. Each row and column represents an intersection between different characters of the sequence. When calculating a score for each particular cell, the algorithm calculates the score as the maximum of zero; a sum of the score from the upper left neighboring cell (which represents an incrementing of both sequences) and a match score that evaluates whether the character of the row matches the character in the column; the score in the cell to the left of the particular cell (representing a skip in the sequence representing the rows) minus a gap penalty; and the score of the top neighbor cell of the particular cell (representing a skip in the sequence representing the columns) minus the gap penalty. Once the scoring table is populated, the algorithm traces back by starting at the highest score cell in the scoring matrix; then recursively choosing the cell to the left, diagonal left, or top from the chosen cell that has the highest score and finally ending at a matrix cell that has a score of zero. All the way, a move to the diagonal left represents choosing both the character in the row and the column; moving to the left represents choosing the character in the column but a gap in the row; and moving up represents choosing the character in the row but a gap in the sequence in the column. Needleman-Wunsch is similar except during scoring the predecessor cell (e.g., the left, top, or top-diagonal left cell) that produced the highest score is saved. During the traceback, the Needleman-Wunsch algorithm starts at the bottom-most right cell and travels back across the path indicated by the saved predecessor cells.

In contrast to character sequences, DAGs may have multiple paths to a particular node. In fact, it is also possible that two adjacent nodes will not share an edge in the graph since a topological ordering does not imply all operations are dependent. In the present disclosure, a scoring table is created with rows representing nodes on a first DAG and columns representing nodes on a second DAG. Each cell thus represents a node x on the first DAG and a second node y on the second DAG. Rather than just considering the three neighboring cells as in the Smith-Waterman or Needleman-Wunsch algorithms, the presently disclosed algorithm factors in the graph structure when scoring cells.

Finally, instead of only recording the optimal choice, the table also stores the best mapping per incoming edge. This is to enable the final traceback phase of the algorithm which will produce the final mapping. Since there may be several operations with multiple inputs coming in, the algorithm needs to produce at least that many paths coming out of this node to be able to map all operations in the DAG.

FIG. 1 illustrates generally a first example of a compute-near-memory system, or CNM system 102. The example of the CNM system 102 includes multiple different memory-compute nodes, such as can each include various compute-near-memory devices. Each node in the system can operate in its own operating system (OS) domain (e.g., Linux, among others). In an example, the nodes can exist collectively in a common OS domain of the CNM system 102.

The example of FIG. 1 includes an example of a first memory-compute node 104 of the CNM system 102. The CNM system 102 can have multiple nodes, such as including different instances of the first memory-compute node 104, that are coupled using a scale fabric 106. In an example, the architecture of the CNM system 102 can support scaling with up to n different memory-compute nodes (e.g., n=4096) using the scale fabric 106. As further discussed below, each node in the CNM system 102 can be an assembly of multiple devices.

The CNM system 102 can include a global controller for the various nodes in the system, or a particular memory-compute node in the system can optionally serve as a host or controller to one or multiple other memory-compute nodes in the same system. The various nodes in the CNM system 102 can thus be similarly or differently configured.

In an example, each node in the CNM system 102 can comprise a host system that uses a specified operating system. The operating system can be common or different among the various nodes in the CNM system 102. In the example of FIG. 1, the first memory-compute node 104 comprises a host system 108, a first switch 110, and a first memory-compute device 112. The host system 108 can comprise a processor, such as can include an X86, ARM, RISC-V, or other type of processor. The first switch 110 can be configured to facilitate communication between or among devices of the first memory-compute node 104 or of the CNM system 102, such as using a specialized or other communication protocol, generally referred to herein as a chip-to-chip protocol interface (CTCPI). That is, the CTCPI can include a specialized interface that is unique to the CNM system 102, or can include or use other interfaces such as the compute express link (CXL) interface, the peripheral component interconnect express (PCIe) interface, or the chiplet protocol interface (CPI), among others. The first switch 110 can include a switch configured to use the CTCPI. For example, the first switch 110 can include a CXL switch, a PCIe switch, a CPI switch, or other type of switch. In an example, the first switch 110 can be configured to couple differently configured endpoints. For example, the first switch 110 can be configured to convert packet formats, such as between PCIe and CPI formats, among others.

The CNM system 102 is described herein in various example configurations, such as comprising a system of nodes, and each node can comprise various chips (e.g., a processor, a switch, a memory device, etc.). In an example, the first memory-compute node 104 in the CNM system 102 can include various chips implemented using chiplets. In the below-discussed chiplet-based configuration of the CNM system 102, inter-chiplet communications, as well as additional communications within the system, can use a CPI network. The CPI network described herein is an example of the CTCPI, that is, as a chiplet-specific implementation of the CTCPI. As a result, the below-described structure, operations, and functionality of CPI can apply equally to structures, operations, and functions as may be otherwise implemented using non-chiplet-based CTCPI implementations. Unless expressly indicated otherwise, any discussion herein of CPI applies equally to CTCPI.

A CPI interface includes a packet-based network that supports virtual channels to enable a flexible and high-speed interaction between chiplets, such as can comprise portions of the first memory-compute node 104 or the CNM system 102. The CPI can enable bridging from intra-chiplet networks to a broader chiplet network. For example, the Advanced eXtensible Interface (AXI) is a specification for intra-chip communications. AXI specifications, however, cover a variety of physical design options, such as the number of physical channels, signal timing, power, etc. Within a single chip, these options are generally selected to meet design goals, such as power consumption, speed, etc. However, to achieve the flexibility of a chiplet-based memory-compute system, an adapter, such as using CPI, can interface between the various AXI design options that can be implemented in the various chiplets. By enabling a physical channel-to-virtual channel mapping and encapsulating time-based signaling with a packetized protocol, CPI can be used to bridge intra-chiplet networks, such as within a particular memory-compute node, across a broader chiplet network, such as across the first memory-compute node 104 or across the CNM system 102.

The CNM system 102 is scalable to include multiple-node configurations. That is, multiple different instances of the first memory-compute node 104, or of other differently configured memory-compute nodes, can be coupled using the scale fabric 106, to provide a scaled system. Each of the memory-compute nodes can run its own operating system and can be configured to jointly coordinate system-wide resource usage.

In the example of FIG. 1, the first switch 110 of the first memory-compute node 104 is coupled to the scale fabric 106. The scale fabric 106 can provide a switch (e.g., a CTCPI switch, a PCIe switch, a CPI switch, or other switch) that can facilitate communication among and between different memory-compute nodes. In an example, the scale fabric 106 can help various nodes communicate in a partitioned global address space (PGAS).

In an example, the first switch 110 from the first memory-compute node 104 is coupled to one or multiple different memory-compute devices, such as including the first memory-compute device 112. The first memory-compute device 112 can comprise a chiplet-based architecture referred to herein as a compute-near-memory (CNM) chiplet. A packaged version of the first memory-compute device 112 can include, for example, one or multiple CNM chiplets. The chiplets can be communicatively coupled using CTCPI for high bandwidth and low latency.

In the example of FIG. 1, the first memory-compute device 112 can include a network on chip (NOC) or first NOC 118. Generally, a NOC is an interconnection network within a device, connecting a particular set of endpoints. In FIG. 1, the first NOC 118 can provide communications and connectivity between the various memory, compute resources, and ports of the first memory-compute device 112.

In an example, the first NOC 118 can comprise a folded Clos topology, such as within each instance of a memory-compute device, or as a mesh that couples multiple memory-compute devices in a node. The Clos topology, such as can use multiple, smaller radix crossbars to provide functionality associated with a higher radix crossbar topology, offers various benefits. For example, the Clos topology can exhibit consistent latency and bisection bandwidth across the NOC.

The first NOC 118 can include various distinct switch types including hub switches, edge switches, and endpoint switches. Each of the switches can be constructed as crossbars that provide substantially uniform latency and bandwidth between input and output nodes. In an example, the endpoint switches and the edge switches can include two separate crossbars, one for traffic headed to the hub switches, and the other for traffic headed away from the hub switches. The hub switches can be constructed as a single crossbar that switches all inputs to all outputs.

In an example, the hub switches can have multiple ports each (e.g., four or six ports each), such as depending on whether the particular hub switch participates in inter-chip communications. A number of hub switches that participates in inter-chip communications can be set by an inter-chip bandwidth requirement.

The first NOC 118 can support various payloads (e.g., from 8 to 64-byte payloads; other payload sizes can similarly be used) between compute elements and memory. In an example, the first NOC 118 can be optimized for relatively smaller payloads (e.g., 8-16 bytes) to efficiently handle access to sparse data structures.

In an example, the first NOC 118 can be coupled to an external host via a first physical-layer interface 114, a PCIe subordinate module 116 or endpoint, and a PCIe principal module 126 or root port. That is, the first physical-layer interface 114 can include an interface to allow an external host processor to be coupled to the first memory-compute device 112. An external host processor can optionally be coupled to one or multiple different memory-compute devices, such as using a PCIe switch or other, native protocol switch. Communication with the external host processor through a PCIe-based switch can limit device-to-device communication to that supported by the switch. Communication through a memory-compute device-native protocol switch such as using CTCPI, in contrast, can allow for more full communication between or among different memory-compute devices, including support for a partitioned global address space, such as for creating threads of work and sending events.

In an example, the CTCPI protocol can be used by the first NOC 118 in the first memory-compute device 112, and the first switch 110 can include a CTCPI switch. The CTCPI switch can allow CTCPI packets to be transferred from a source memory-compute device, such as the first memory-compute device 112, to a different, destination memory-compute device (e.g., on the same or other node), such as without being converted to another packet format.

In an example, the first memory-compute device 112 can include an internal host processor 122. The internal host processor 122 can be configured to communicate with the first NOC 118 or other components or modules of the first memory-compute device 112, for example, using the internal PCIe principal module 126, which can help eliminate a physical layer that would consume time and energy. In an example, the internal host processor 122 can be based on a RISC-V ISA processor, and can use the first physical-layer interface 114 to communicate outside of the first memory-compute device 112, such as to other storage, networking, or other peripherals to the first memory-compute device 112. The internal host processor 122 can control the first memory-compute device 112 and can act as a proxy for operating system-related functionality. The internal host processor 122 can include a relatively small number of processing cores (e.g., 2-4 cores) and a host memory device 124 (e.g., comprising a DRAM module).

In an example, the internal host processor 122 can include PCI root ports. When the internal host processor 122 is in use, then one of its root ports can be connected to the PCIe subordinate module 116. Another of the root ports of the internal host processor 122 can be connected to the first physical-layer interface 114, such as to provide communication with external PCI peripherals. When the internal host processor 122 is disabled, then the PCIe subordinate module 116 can be coupled to the first physical-layer interface 114 to allow an external host processor to communicate with the first NOC 118. In an example of a system with multiple memory-compute devices, the first memory-compute device 112 can be configured to act as a system host or controller. In this example, the internal host processor 122 can be in use, and other instances of internal host processors in the respective other memory-compute devices can be disabled.

The internal host processor 122 can be configured at power-up of the first memory-compute device 112, such as to allow the host to initialize. In an example, the internal host processor 122 and its associated data paths (e.g., including the first physical-layer interface 114, the PCIe subordinate module 116, etc.) can be configured from input pins to the first memory-compute device 112. One or more of the pins can be used to enable or disable the internal host processor 122 and configure the PCI (or other) data paths accordingly.

In an example, the first NOC 118 can be coupled to the scale fabric 106 via a scale fabric interface module 136 and a second physical-layer interface 138. The scale fabric interface module 136, or SIF, can facilitate communication between the first memory-compute device 112 and a device space, such as a partitioned global address space (PGAS). The PGAS can be configured such that a particular memory-compute device, such as the first memory-compute device 112, can access memory or other resources on a different memory-compute device (e.g., on the same or different node), such as using a load/store paradigm. Various scalable fabric technologies can be used, including CTCPI, CPI, Gen-Z, PCI, or Ethernet bridged over CXL. The scale fabric 106 can be configured to support various packet formats. In an example, the scale fabric 106 supports orderless packet communications, or supports ordered packets such as can use a path identifier to spread bandwidth across multiple equivalent paths. The scale fabric 106 can generally support remote operations such as remote memory read, write, and other built-in atomics, remote memory atomics, remote memory-compute device send events, and remote memory-compute device call and return operations.

In an example, the first NOC 118 can be coupled to one or multiple different memory modules, such as including a first memory device 128. The first memory device 128 can include various kinds of memory devices, for example, LPDDR5 or GDDR6, among others. In the example of FIG. 1, the first NOC 118 can coordinate communications with the first memory device 128 via a memory controller 130 that can be dedicated to the particular memory module. In an example, the memory controller 130 can include a memory module cache and an atomic operations module. The atomic operations module can be configured to provide relatively high-throughput atomic operators, such as including integer and floating-point operators. The atomic operations module can be configured to apply its operators to data within the memory module cache (e.g., comprising SRAM memory side cache), thereby allowing back-to-back atomic operations using the same memory location, with minimal throughput degradation.

The memory module cache can provide storage for frequently accessed memory locations, such as without having to re-access the first memory device 128. In an example, the memory module cache can be configured to cache data only for a particular instance of the memory controller 130. In an example, the memory controller 130 includes a DRAM controller configured to interface with the first memory device 128, such as including DRAM devices. The memory controller 130 can provide access scheduling and bit error management, among other functions.

In an example, the first NOC 118 can be coupled to a hybrid threading processor (HTP 140), a hybrid threading fabric (HTF 142) and a host interface and dispatch module (HIF 120). The HIF 120 can be configured to facilitate access to host-based command request queues and response queues. In an example, the HIF 120 can dispatch new threads of execution on processor or compute elements of the HTP 140 or the HTF 142. In an example, the HIF 120 can be configured to maintain workload balance across the HTP 140 module and the HTF 142 module.

The hybrid threading processor, or HTP 140, can include an accelerator, such as can be based on a RISC-V instruction set. The HTP 140 can include a highly threaded, event-driven processor in which threads can be executed in single instruction rotation, such as to maintain high instruction throughput. The HTP 140 comprises relatively few custom instructions to support low-overhead threading capabilities, event send/receive, and shared memory atomic operators.

The hybrid threading fabric, or HTF 142, can include an accelerator, such as can include a non-von Neumann, coarse-grained, reconfigurable processor. The HTF 142 can be optimized for high-level language operations and data types (e.g., integer or floating point). In an example, the HTF 142 can support data flow computing. The HTF 142 can be configured to use substantially all of the memory bandwidth available on the first memory-compute device 112, such as when executing memory-bound compute kernels.

The HTP and HTF accelerators of the CNM system 102 can be programmed using various high-level, structured programming languages. For example, the HTP and HTF accelerators can be programmed using C/C++, such as using the LLVM compiler framework. The HTP accelerator can leverage an open source compiler environment, such as with various added custom instruction sets configured to improve memory access efficiency, provide a message passing mechanism, and manage events, among other things. In an example, the HTF accelerator can be designed to enable programming of the HTF 142 using a high-level programming language, and the compiler can generate a simulator configuration file or a binary file that runs on the HTF 142 hardware. The HTF 142 can provide a mid-level language for expressing algorithms precisely and concisely, while hiding configuration details of the HTF accelerator itself. In an example, the HTF accelerator tool chain can use an LLVM front-end compiler and the LLVM intermediate representation (IR) to interface with an HTF accelerator back end.

Figure 2:
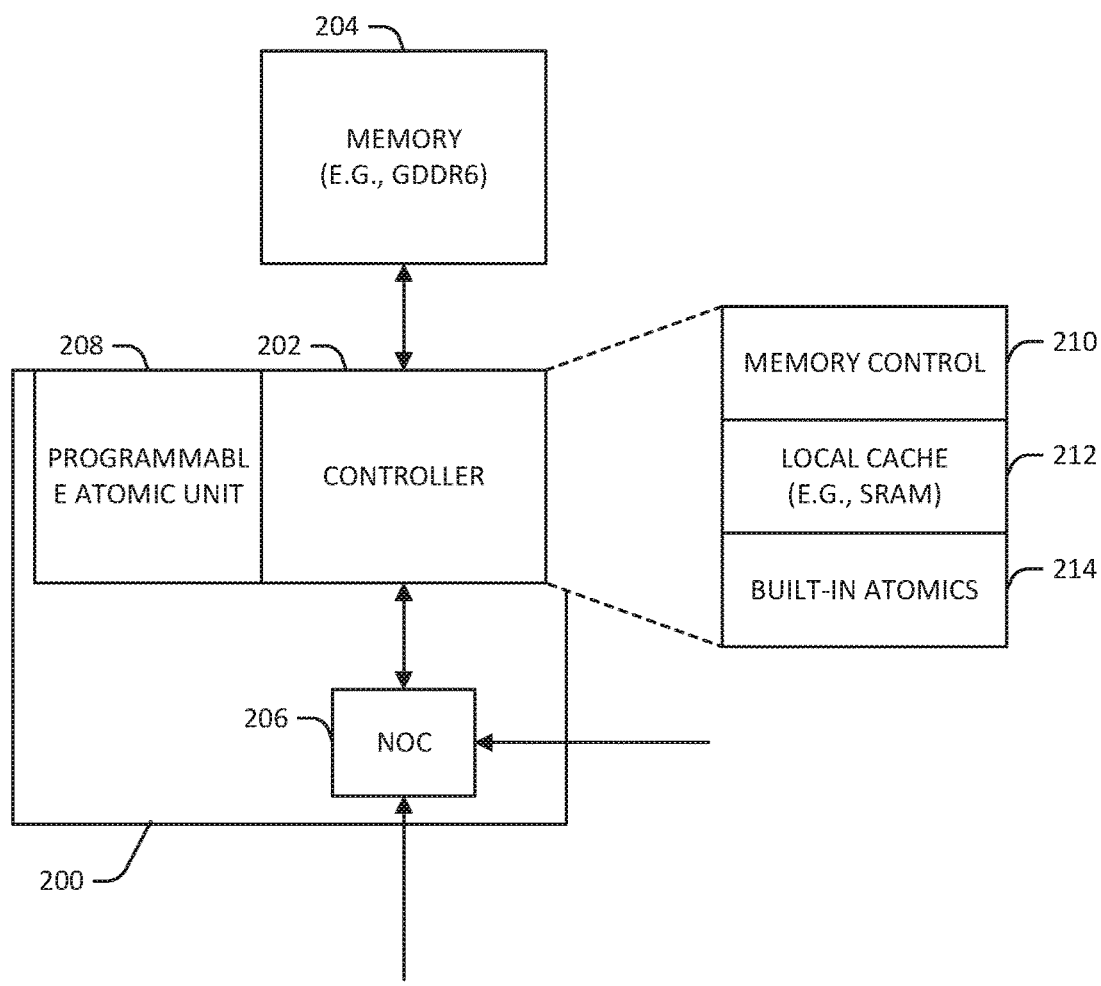
FIG. 2 illustrates generally an example of a memory subsystem of a memory-compute device, according to an embodiment.

FIG. 2 illustrates generally an example of a memory subsystem 200 of a memory-compute device, according to an embodiment. The example of the memory subsystem 200 includes a controller 202, a programmable atomic unit 208, and a second NOC 206. The controller 202 can include or use the programmable atomic unit 208 to carry out operations using information in a memory device 204. In an example, the memory subsystem 200 comprises a portion of the first memory-compute device 112 from the example of FIG. 1, such as including portions of the first NOC 118 or of the memory controller 130.

In the example of FIG. 2, the second NOC 206 is coupled to the controller 202 and the controller 202 can include a memory control module 210, a local cache module 212, and a built-in atomics module 214. In an example, the built-in atomics module 214 can be configured to handle relatively simple, single-cycle, integer atomics. The built-in atomics module 214 can perform atomics at the same throughput as, for example, normal memory read or write operations. In an example, an atomic memory operation can include a combination of storing data to the memory, performing an atomic memory operation, and then responding with load data from the memory.

The local cache module 212, such as can include an SRAM cache, can be provided to help reduce latency for repetitively-accessed memory locations. In an example, the local cache module 212 can provide a read buffer for sub-memory line accesses. The local cache module 212 can be particularly beneficial for compute elements that have relatively small or no data caches.

The memory control module 210, such as can include a DRAM controller, can provide low-level request buffering and scheduling, such as to provide efficient access to the memory device 204, such as can include a DRAM device. In an example, the memory device 204 can include or use a GDDR6 DRAM device, such as having 16 Gb density and 64 Gb/sec peak bandwidth. Other devices can similarly be used.

In an example, the programmable atomic unit 208 can comprise single-cycle or multiple-cycle operator such as can be configured to perform integer addition or more complicated multiple-instruction operations such as bloom filter insert. In an example, the programmable atomic unit 208 can be configured to perform load and store-to-memory operations. The programmable atomic unit 208 can be configured to leverage the RISC-V ISA with a set of specialized instructions to facilitate interactions with the controller 202 to atomically perform user-defined operations.

Programmable atomic requests, such as received from an on-node or off-node host, can be routed to the programmable atomic unit 208 via the second NOC 206 and the controller 202. In an example, custom atomic operations (e.g., carried out by the programmable atomic unit 208) can be identical to built-in atomic operations (e.g., carried out by the built-in atomics module 214) except that a programmable atomic operation can be defined or programmed by the user rather than the system architect. In an example, programmable atomic request packets can be sent through the second NOC 206 to the controller 202, and the controller 202 can identify the request as a custom atomic. The controller 202 can then forward the identified request to the programmable atomic unit 208.

Figure 3:
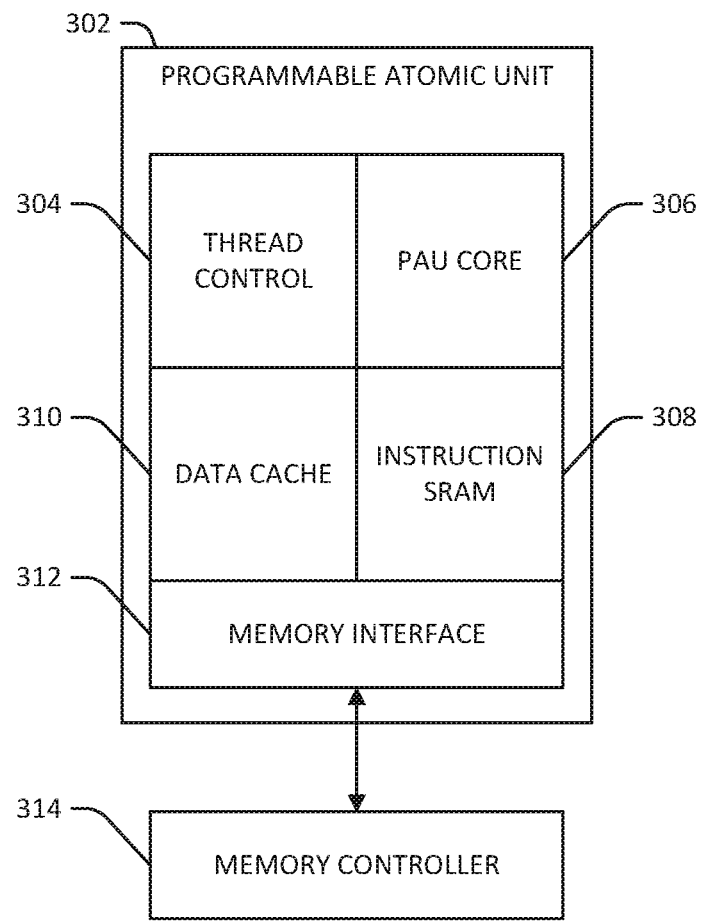
FIG. 3 illustrates generally an example of a programmable atomic unit for a memory controller, according to an embodiment.

FIG. 3 illustrates generally an example of a programmable atomic unit 302 for use with a memory controller, according to an embodiment. In an example, the programmable atomic unit 302 can comprise or correspond to the programmable atomic unit 208 from the example of FIG. 2. That is, FIG. 3 illustrates components in an example of a programmable atomic unit 302 (PAU), such as those noted above with respect to FIG. 2 (e.g., in the programmable atomic unit 208), or to FIG. 1 (e.g., in an atomic operations module of the memory controller 130). As illustrated in FIG. 3, the programmable atomic unit 302 includes a PAU processor or PAU core 306, a PAU thread control 304, an instruction SRAM 308, a data cache 310, and a memory interface 312 to interface with the memory controller 314. In an example, the memory controller 314 comprises an example of the controller 202 from the example of FIG. 2.

In an example, the PAU core 306 is a pipelined processor such that multiple stages of different instructions are executed together per clock cycle. The PAU core 306 can include a barrel-multithreaded processor, with thread control 304 circuitry to switch between different register files (e.g., sets of registers containing current processing state) upon each clock cycle. This enables efficient context switching between currently executing threads. In an example, the PAU core 306 supports eight threads, resulting in eight register files. In an example, some or all of the register files are not integrated into the PAU core 306, but rather reside in a local data cache 310 or the instruction SRAM 308. This reduces circuit complexity in the PAU core 306 by eliminating the traditional flip-flops used for registers in such memories.

The local PAU memory can include instruction SRAM 308, such as can include instructions for various atomics. The instructions comprise sets of instructions to support various application-loaded atomic operators. When an atomic operator is requested, such as by an application chiplet, a set of instructions corresponding to the atomic operator are executed by the PAU core 306. In an example, the instruction SRAM 308 can be partitioned to establish the sets of instructions. In this example, the specific programmable atomic operator being requested by a requesting process can identify the programmable atomic operator by the partition number. The partition number can be established when the programmable atomic operator is registered with (e.g., loaded onto) the programmable atomic unit 302. Other metadata for the programmable instructions can be stored in memory (e.g., in partition tables) in memory local to the programmable atomic unit 302.

In an example, atomic operators manipulate the data cache 310, which is generally synchronized (e.g., flushed) when a thread for an atomic operator completes. Thus, aside from initial loading from the external memory, such as from the memory controller 314, latency can be reduced for most memory operations during execution of a programmable atomic operator thread.

A pipelined processor, such as the PAU core 306, can experience an issue when an executing thread attempts to issue a memory request if an underlying hazard condition would prevent such a request. Here, the memory request is to retrieve data from the memory controller 314, whether it be from a cache on the memory controller 314 or off-die memory. To resolve this issue, the PAU core 306 is configured to deny the memory request for a thread. Generally, the PAU core 306 or the thread control 304 can include circuitry to enable one or more thread rescheduling points in the pipeline. Here, the denial occurs at a point in the pipeline that is beyond (e.g., after) these thread rescheduling points. In an example, the hazard occurred beyond the rescheduling point. Here, a preceding instruction in the thread created the hazard after the memory request instruction passed the last thread rescheduling point prior to the pipeline stage in which the memory request could be made.

In an example, to deny the memory request, the PAU core 306 is configured to determine (e.g., detect) that there is a hazard on memory indicated in the memory request. Here, hazard denotes any condition such that allowing (e.g., performing) the memory request will result in an inconsistent state for the thread. In an example, the hazard is an in-flight memory request. Here, whether or not the data cache 310 includes data for the requested memory address, the presence of the in-flight memory request makes it uncertain what the data in the data cache 310 at that address should be. Thus, the thread must wait for the in-flight memory request to be completed to operate on current data. The hazard is cleared when the memory request completes.

In an example, the hazard is a dirty cache line in the data cache 310 for the requested memory address. Although the dirty cache line generally indicates that the data in the cache is current and the memory controller version of this data is not, an issue can arise on thread instructions that do not operate from the cache. An example of such an instruction uses a built-in atomic operator, or other separate hardware block, of the memory controller 314. In the context of a memory controller, the built-in atomic operators can be separate from the programmable atomic unit 302 and do not have access to the data cache 310 or instruction SRAM 308 inside the PAU. If the cache line is dirty, then the built-in atomic operator will not be operating on the most current data until the data cache 310 is flushed to synchronize the cache and the other or off-die memories. This same situation could occur with other hardware blocks of the memory controller, such as cryptography block, encoder, etc.

Figure 4:
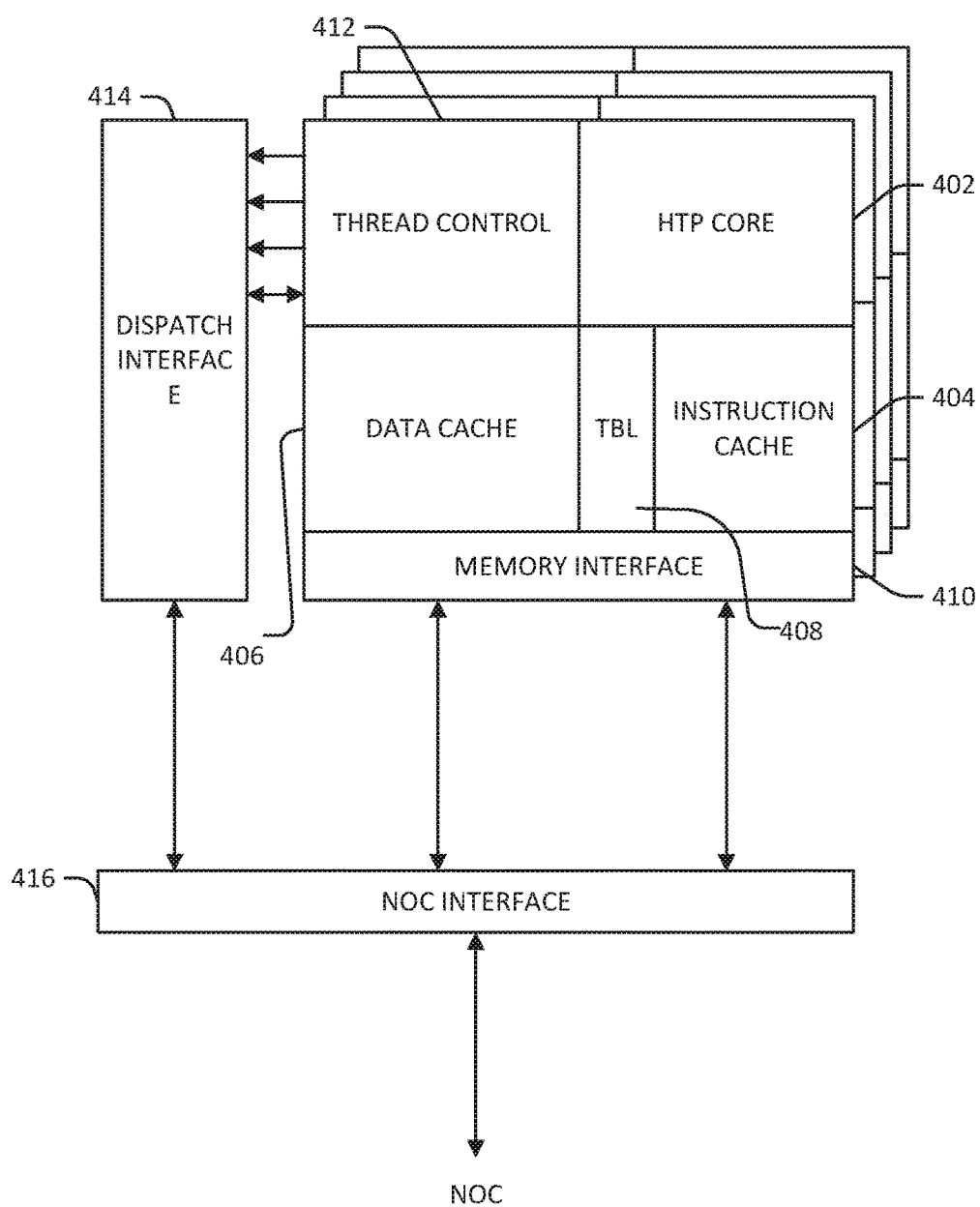
FIG. 4 illustrates an example of a hybrid threading processor (HTP) accelerator of a memory-compute device, according to an embodiment.

FIG. 4 illustrates an example of a hybrid threading processor (HTP) accelerator, or HTP accelerator 400. The HTP accelerator 400 can comprise a portion of a memory-compute device, according to an embodiment. In an example, the HTP accelerator 400 can include or comprise the HTP 140 from the example of FIG. 1. The HTP accelerator 400 includes, for example, a HTP core 402, an instruction cache 404, a data cache 406, a translation block 408, a memory interface 410, and a thread controller 412. The HTP accelerator 400 can further include a dispatch interface 414 and a NOC interface 416, such as for interfacing with a NOC such as the first NOC 118 from the example of FIG. 1, the second NOC 206 from the example of FIG. 2, or other NOC.

In an example, the HTP accelerator 400 includes a module that is based on a RISC-V instruction set, and can include a relatively small number of other or additional custom instructions to support a low-overhead, threading-capable Hybrid Threading (HT) language. The HTP accelerator 400 can include a highly-threaded processor core, the HTP core 402, in which, or with which, threads can be executed in a single instruction rotation, such as to maintain high instruction throughput. In an example, a thread can be paused when it waits for other, pending events to complete. This can allow the compute resources to be efficiently used on relevant work instead of polling. In an example, multiple-thread barrier synchronization can use efficient HTP-to-HTP and HTP-to/from-Host messaging, such as can allow thousands of threads to initialize or wake in, for example, tens of clock cycles.

In an example, the dispatch interface 414 can comprise a functional block of the HTP accelerator 400 for handling hardware-based thread management. That is, the dispatch interface 414 can manage dispatch of work to the HTP core 402 or other accelerators. Non-HTP accelerators, however, are generally not able to dispatch work. In an example, work dispatched from a host can use dispatch queues that reside in, e.g., host main memory (e.g., DRAM-based memory). Work dispatched from the HTP accelerator 400, on the other hand, can use dispatch queues that reside in SRAM, such as within the dispatches for the target HTP accelerator 400 within a particular node.

In an example, the HTP core 402 can comprise one or more cores that execute instructions on behalf of threads. That is, the HTP core 402 can include an instruction processing block. The HTP core 402 can further include, or can be coupled to, the thread controller 412. The thread controller 412 can provide thread control and state for each active thread within the HTP core 402. The data cache 406 can include cache for a host processor (e.g., for local and remote memory-compute devices, including for the HTP core 402), and the instruction cache 404 can include cache for use by the HTP core 402. In an example, the data cache 406 can be configured for read and write operations, and the instruction cache 404 can be configured for read only operations.

In an example, the data cache 406 is a small cache provided per hardware thread. The data cache 406 can temporarily store data for use by the owning thread. The data cache 406 can be managed by hardware or software in the HTP accelerator 400. For example, hardware can be configured to automatically allocate or evict lines as needed, as load and store operations are executed by the HTP core 402. Software, such as using RISC-V instructions, can determine which memory accesses should be cached, and when lines should be invalidated or written back to other memory locations.

Data caching on the HTP accelerator 400 has various benefits, including making larger accesses more efficient for the memory controller, allowing an executing thread to avoid stalling. However, there are situations when using the cache causes inefficiencies. An example includes accesses where data is accessed only once, and causes thrashing of the cache lines. To help address this problem, the HTP accelerator 400 can use a set of custom load instructions to force a load instruction to check for a cache hit, and on a cache miss to issue a memory request for the requested operand and not put the obtained data in the data cache 406. The HTP accelerator 400 thus includes various different types of load instructions, including non-cached and cache line loads. The non-cached load instructions use the cached data if dirty data is present in the cache. The non-cached load instructions ignore clean data in the cache, and do not write accessed data to the data cache. For cache line load instructions, the complete data cache line (e.g., comprising 64 bytes) can be loaded from memory into the data cache 406, and can load the addressed memory into a specified register. These loads can use the cached data if clean or dirty data is in the data cache 406. If the referenced memory location is not in the data cache 406, then the entire cache line can be accessed from memory. Use of the cache line load instructions can reduce cache misses when sequential memory locations are being referenced (such as memory copy operations) but can also waste memory and bandwidth at the NOC interface 416 if the referenced memory data is not used.

In an example, the HTP accelerator 400 includes a custom store instruction that is non-cached. The non-cached store instruction can help avoid thrashing the data cache 406 with write data that is not sequentially written to memory.

In an example, the HTP accelerator 400 further includes a translation block 408. The translation block 408 can include a virtual-to-physical translation block for local memory of a memory-compute device. For example, a host processor, such as in the HTP core 402, can execute a load or store instruction, and the instruction can generate a virtual address. The virtual address can be translated to a physical address of the host processor, such as using a translation table from the translation block 408. The memory interface 410, for example, can include an interface between the HTP core 402 and the NOC interface 416.

Figure 5:
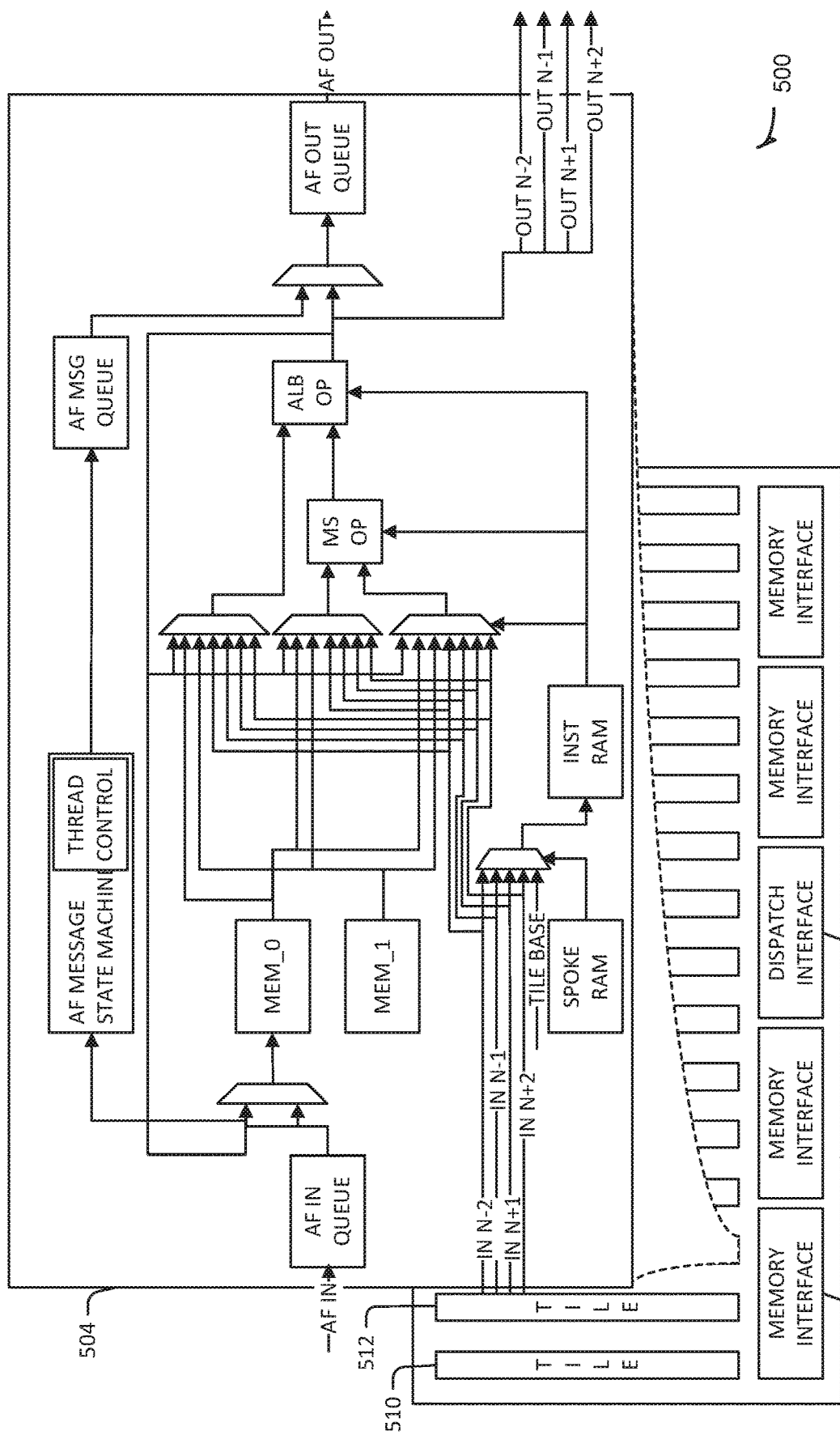
FIG. 5 illustrates an example of a representation of a hybrid threading fabric (HTF) of a memory-compute device, according to an embodiment.

FIG. 5 illustrates an example of a representation of a hybrid threading fabric (HTF), or HTF 500, of a memory-compute device, according to an embodiment. In an example, the HTF 500 can include or comprise the HTF 142 from the example of FIG. 1. The HTF 500 is a coarse-grained, reconfigurable compute fabric that can be optimized for high-level language operand types and operators (e.g., using C/C++ or other high-level language). In an example, the HTF 500 can include configurable, n-bit wide (e.g., 512-bit wide) data paths that interconnect hardened SIMD arithmetic units.

In an example, the HTF 500 comprises an HTF cluster 502 that includes multiple HTF tiles, including an example tile 504, or Tile N. Each HTF tile can include one or more compute elements with local memory and arithmetic functions. For example, each tile can include a compute pipeline with support for integer and floating-point operations. In an example, the data path, compute elements, and other infrastructure can be implemented as hardened IP to provide maximum performance while minimizing power consumption and reconfiguration time.

In the example of FIG. 5, the tiles comprising the HTF cluster 502 are linearly arranged, and each tile in the cluster can be coupled to one or multiple other tiles in the HTF cluster 502. In the example of FIG. 5, the example tile 504, or Tile N, is coupled to four other tiles, including to a base tile 510 (e.g., Tile N−2) via the port labeled SF IN N−2, to an adjacent tile 512 (e.g., Tile N−1) via the port labeled SF IN N−1, and to a Tile N+1 via the port labeled SF IN N+1 and to a Tile N+2 via the port labeled SF IN N+2. The example tile 504 can be coupled to the same or other tiles via respective output ports, such as those labeled SF OUT N−1, SF OUT N−2, SF OUT N+1, and SF OUT N+2. In this example, the ordered list of names for the various tiles are notional indications of the positions of the tiles. In other examples, the tiles comprising the HTF cluster 502 can be arranged in a grid or other configuration, with each tile similarly coupled to one or several of its nearest neighbors in the grid. Tiles that are provided at an edge of a cluster can optionally have fewer connections to neighboring tiles. For example, Tile N−2, or the base tile 510 in the example of FIG. 5, can be coupled only to the adjacent tile 512 (Tile N−1) and to the example tile 504 (Tile N). Fewer or additional inter-tile connections can similarly be used.

The HTF cluster 502 can further include memory interface modules, including a first memory interface module 506. The memory interface modules can couple the HTF cluster 502 to a NOC, such as the first NOC 118. In an example, the memory interface modules can allow tiles within a cluster to make requests to other locations in a memory-compute system, such as in the same or different node in the system. That is, the representation of the HTF 500 can comprise a portion of a larger fabric that can be distributed across multiple nodes, such as with one or more HTF tiles or HTF clusters at each of the nodes. Requests can be made between tiles or nodes within the context of the larger fabric.

In the example of FIG. 5, the tiles in the HTF cluster 502 are coupled using a synchronous fabric (SF). The synchronous fabric can provide communication between a particular tile and its neighboring tiles in the HTF cluster 502, as described above. Each HTF cluster 502 can further include an asynchronous fabric (AF) that can provide communication among, e.g., the tiles in the cluster, the memory interfaces in the cluster, and a dispatch interface 508 in the cluster.

In an example, the synchronous fabric can exchange messages that include data and control information. The control information can include, among other things, instruction RAM address information or a thread identifier. The control information can be used to set up a data path, and a data message field can be selected as a source for the path. Generally, the control fields can be provided or received earlier, such that they can be used to configure the data path. For example, to help minimize any delay through the synchronous domain pipeline in a tile, the control information can arrive at a tile a few clock cycles before the data field. Various registers can be provided to help coordinate dataflow timing in the pipeline.

In an example, each tile in the HTF cluster 502 can include multiple memories. Each memory can have the same width as the data path (e.g., 512 bits) and can have a specified depth, such as in a range of 512 to 1024 elements. The tile memories can be used to store data that supports data path operations. The stored data can include constants loaded as part of a kernel's cluster configuration, for example, or can include variables calculated as part of the data flow. In an example, the tile memories can be written from the asynchronous fabric as a data transfer from another synchronous domain, or can include a result of a load operation such as initiated by another synchronous domain. The tile memory can be read via synchronous data path instruction execution in the synchronous domain.

In an example, each tile in an HTF cluster 502 can have a dedicated instruction RAM (INST RAM). In an example of an HTF cluster 502 with sixteen tiles, and instruction RAM instances with sixty-four entries, the cluster can allow algorithms to be mapped with up to 1024 multiply-shift and/or ALU operations. The various tiles can optionally be pipelined together, such as using the synchronous fabric, to allow data flow compute with minimal memory access, thus minimizing latency and reducing power consumption. In an example, the asynchronous fabric can allow memory references to proceed in parallel with computation, thereby providing more efficient streaming kernels. In an example, the various tiles can include built-in support for loop-based constructs and can support nested looping kernels.

The synchronous fabric can allow multiple tiles to be pipelined, such as without a need for data queuing. Tiles that participate in a synchronous domain can, for example, act as a single pipelined data path. A first or base tile (e.g., Tile N−2, in the example of FIG. 5) of a synchronous domain can initiate a thread of work through the pipelined tiles. The base tile can be responsible for starting work on a predefined cadence referred to herein as a Spoke Count. For example, if the Spoke Count is 3, then the base tile can initiate work every third clock cycle.

In an example, the synchronous domain comprises a set of connected tiles in the HTF cluster 502. Execution of a thread can begin at the domain's base tile and can progress from the base tile, via the synchronous fabric, to other tiles in the same domain. The base tile can provide the instruction to be executed for the first tile. The first tile can, by default, provide the same instruction for the other connected tiles to execute. However, in some examples, the base tile, or a subsequent tile, can conditionally specify or use an alternative instruction. The alternative instruction can be chosen by having the tile's data path produce a Boolean conditional value, and then can use the Boolean value to choose between an instruction set of the current tile and the alternate instruction.

The asynchronous fabric can be used to perform operations that occur asynchronously relative to a synchronous domain. Each tile in the HTF cluster 502 can include an interface to the asynchronous fabric. The inbound interface can include, for example, a FIFO buffer or queue (e.g., AF IN QUEUE) to provide storage for message that cannot be immediately processed. Similarly, the outbound interface of the asynchronous fabric can include a FIFO buffer or queue (e.g., AF OUT QUEUE) to provide storage for messages that cannot be immediately sent out.

In an example, messages in the asynchronous fabric can be classified as data messages or control messages. Data messages can include a SIMD width data value that is written to either tile memory 0 (MEM_0) or memory 1 (MEM_1). Control messages can be configured to control thread creation, to free resources, or to issue external memory references.

A tile in the HTF cluster 502 can perform various compute operations for the HTF. The compute operations can be performed by configuring the data path within the tile. In an example, a tile includes two functional blocks that perform the compute operations for the tile: a Multiply and Shift Operation block (MS OP) and an Arithmetic, Logical, and Bit Operation block (ALB OP). The two blocks can be configured to perform pipelined operations such as a Multiply and Add, or a Shift and Add, among others.

In an example, each instance of a memory-compute device in a system can have a complete supported instruction set for its operator blocks (e.g., MS OP and ALB OP). In this case, binary compatibility can be realized across all devices in the system. However, in some examples, it can be helpful to maintain a base set of functionality and optional instruction set classes, such as to meet various design tradeoffs, such as die size. The approach can be similar to how the RISC-V instruction set has a base set and multiple optional instruction subsets.

In an example, the example tile 504 can include a Spoke RAM. The Spoke RAM can be used to specify which input (e.g., from among the four SF tile inputs and the base tile input) is the primary input for each clock cycle. The Spoke RAM read address input can originate at a counter that counts from zero to Spoke Count minus one. In an example, different spoke counts can be used on different tiles, such as within the same HTF cluster 502, to allow a number of slices, or unique tile instances, used by an inner loop to determine the performance of a particular application or instruction set. In an example, the Spoke RAM can specify when a synchronous input is to be written to a tile memory, for instance when multiple inputs for a particular tile instruction are used and one of the inputs arrives before the others. The early-arriving input can be written to the tile memory and can be later read when all of the inputs are available. In this example, the tile memory can be accessed as a FIFO memory, and FIFO read and write pointers can be stored in a register-based memory region or structure in the tile memory.

FIG. 6A and FIG. 6B illustrate generally an example of a chiplet system that can be used to implement one or more aspects of the CNM system 102. As similarly mentioned above, a node in the CNM system 102, or a device within a node in the CNM system 102, can include a chiplet-based architecture or compute-near-memory (CNM) chiplet. A packaged memory-compute device can include, for example, one, two, or four CNM chiplets. The chiplets can be interconnected using high-bandwidth, low-latency interconnects such as using a CPI interface. Generally, a chiplet system is made up of discrete modules (each a "chiplet") that are integrated on an interposer and, in many examples, are interconnected as desired through one or more established networks to provide a system with the desired functionality. The interposer and included chiplets can be packaged together to facilitate interconnection with other components of a larger system. Each chiplet can include one or more individual integrated circuits (ICs), or "chips," potentially in combination with discrete circuit components, and can be coupled to a respective substrate to facilitate attachment to the interposer. Most or all chiplets in a system can be individually configured for communication through established networks.

The configuration of chiplets as individual modules of a system is distinct from such a system being implemented on single chips that contain distinct device blocks (e.g., intellectual property (IP) blocks) on one substrate (e.g., single die), such as a system-on-a-chip (SoC), or multiple discrete packaged devices integrated on a printed circuit board (PCB). In general, chiplets provide better performance (e.g., lower power consumption, reduced latency, etc.) than discrete packaged devices, and chiplets provide greater production benefits than single die chips. These production benefits can include higher yields or reduced development costs and time.

Chiplet systems can include, for example, one or more application (or processor) chiplets and one or more support chiplets. Here, the distinction between application and support chiplets is simply a reference to the likely design scenarios for the chiplet system. Thus, for example, a synthetic vision chiplet system can include, by way of example only, an application chiplet to produce the synthetic vision output along with support chiplets, such as a memory controller chiplet, a sensor interface chiplet, or a communication chiplet. In a typical use case, the synthetic vision designer can design the application chiplet and source the support chiplets from other parties. Thus, the design expenditure (e.g., in terms of time or complexity) is reduced because by avoiding the design and production of functionality embodied in the support chiplets.

Chiplets also support the tight integration of IP blocks that can otherwise be difficult, such as those manufactured using different processing technologies or using different feature sizes (or utilizing different contact technologies or spacings). Thus, multiple ICs or IC assemblies, with different physical, electrical, or communication characteristics can be assembled in a modular manner to provide an assembly with various desired functionalities. Chiplet systems can also facilitate adaptation to suit needs of different larger systems into which the chiplet system will be incorporated. In an example, ICs or other assemblies can be optimized for the power, speed, or heat generation for a specific function—as can happen with sensors—can be integrated with other devices more easily than attempting to do so on a single die. Additionally, by reducing the overall size of the die, the yield for chiplets tends to be higher than that of more complex, single die devices.

FIG. 6A and FIG. 6B illustrate generally an example of a chiplet system, according to an embodiment. FIG. 6A is a representation of the chiplet system 602 mounted on a peripheral board 604, that can be connected to a broader computer system by a peripheral component interconnect express (PCIe), for example. The chiplet system 602 includes a package substrate 606, an interposer 608, and four chiplets, an application chiplet 610, a host interface chiplet 612, a memory controller chiplet 614, and a memory device chiplet 616. Other systems can include many additional chiplets to provide additional functionalities as will be apparent from the following discussion. The package of the chiplet system 602 is illustrated with a lid or cover 618, though other packaging techniques and structures for the chiplet system can be used. FIG. 6B is a block diagram labeling the components in the chiplet system for clarity.

The application chiplet 610 is illustrated as including a chiplet system NOC 620 to support a chiplet network 622 for inter-chiplet communications. In example embodiments the chiplet system NOC 620 can be included on the application chiplet 610. In an example, the first NOC 118 from the example of FIG. 1 can be defined in response to selected support chiplets (e.g., host interface chiplet 612, memory controller chiplet 614, and memory device chiplet 616) thus enabling a designer to select an appropriate number or chiplet network connections or switches for the chiplet system NOC 620. In an example, the chiplet system NOC 620 can be located on a separate chiplet, or within the interposer 608. In examples as discussed herein, the chiplet system NOC 620 implements a chiplet protocol interface (CPI) network.

In an example, the chiplet system 602 can include or comprise a portion of the first memory-compute node 104 or the first memory-compute device 112. That is, the various blocks or components of the first memory-compute device 112 can include chiplets that can be mounted on the peripheral board 604, the package substrate 606, and the interposer 608. The interface components of the first memory-compute device 112 can comprise, generally, the host interface chiplet 612, the memory and memory control-related components of the first memory-compute device 112 can comprise, generally, the memory controller chiplet 614, the various accelerator and processor components of the first memory-compute device 112 can comprise, generally, the application chiplet 610 or instances thereof, and so on.

The CPI interface, such as can be used for communication between or among chiplets in a system, is a packet-based network that supports virtual channels to enable a flexible and high-speed interaction between chiplets. CPI enables bridging from intra-chiplet networks to the chiplet network 622. For example, the Advanced eXtensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 622.

CPI can use a variety of different physical layers to transmit packets. The physical layer can include simple conductive connections, or can include drivers to increase the voltage, or otherwise facilitate transmitting the signals over longer distances. An example of one such a physical layer can include the Advanced Interface Bus (AIB), which in various examples, can be implemented in the interposer 608. AIB transmits and receives data using source synchronous data transfers with a forwarded clock. Packets are transferred across the AIB at single data rate (SDR) or dual data rate (DDR) with respect to the transmitted clock. Various channel widths are supported by AIB. The channel can be configured to have a symmetrical number of transmit (TX) and receive (RX) input/outputs (I/Os), or have a non-symmetrical number of transmitters and receivers (e.g., either all transmitters or all receivers). The channel can act as an AIB principal or subordinate depending on which chiplet provides the principal clock. AIB I/O cells support three clocking modes: asynchronous (i.e. non-clocked), SDR, and DDR. In various examples, the non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half TX and half RX. CPI packet protocols can use an AIB channel in either SDR or DDR operation modes. In an example, the AIB channel is configured in increments of 80 I/O cells (i.e. 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency can be utilized. CPI includes elements to minimize both latency and energy consumption in these ultra-short reach chiplet interconnects.

For flow control, CPI employs a credit-based technique. A recipient, such as the application chiplet 610, provides a sender, such as the memory controller chiplet 614, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender allow transmitting of additional information.

The example of FIG. 6A includes a chiplet mesh network 624 that uses a direct, chiplet-to-chiplet technique without a need for the chiplet system NOC 620. The chiplet mesh network 624 can be implemented in CPI, or another chiplet-to-chiplet protocol. The chiplet mesh network 624 generally enables a pipeline of chiplets where one chiplet serves as the interface to the pipeline while other chiplets in the pipeline interface only with themselves.

Additionally, dedicated device interfaces, such as one or more industry standard memory interfaces (such as, for example, synchronous memory interfaces, such as DDR5, DDR6), can be used to connect a device to a chiplet. Connection of a chiplet system or individual chiplets to external devices (such as a larger system can be through a desired interface (for example, a PCIe interface). Such an external interface can be implemented, in an example, through the host interface chiplet 612, which in the depicted example, provides a PCIe interface external to chiplet system. Such dedicated chiplet interfaces 626 are generally employed when a convention or standard in the industry has converged on such an interface. The illustrated example of a Double Data Rate (DDR) interface connecting the memory controller chiplet 614 to a dynamic random access memory (DRAM) memory device chiplet 616 is just such an industry convention.

Of the variety of possible support chiplets, the memory controller chiplet 614 is likely present in the chiplet system due to the near omnipresent use of storage for computer processing as well as sophisticated state-of-the-art for memory devices. Thus, using memory device chiplets 616 and memory controller chiplets 614 produced by others gives chiplet system designers access to robust products by sophisticated producers. Generally, the memory controller chiplet 614 provides a memory device-specific interface to read, write, or erase data. Often, the memory controller chiplet 614 can provide additional features, such as error detection, error correction, maintenance operations, or atomic operator execution. For some types of memory, maintenance operations tend to be specific to the memory device chiplet 616, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh can be controlled by a host processor or of a memory controller at some times, and at other times controlled by the DRAM memory device, or by logic associated with one or more DRAM devices, such as an interface chip (in an example, a buffer).

Atomic operators are a data manipulation that, for example, can be performed by the memory controller chiplet 614. In other chiplet systems, the atomic operators can be performed by other chiplets. For example, an atomic operator of "increment" can be specified in a command by the application chiplet 610, the command including a memory address and possibly an increment value. Upon receiving the command, the memory controller chiplet 614 retrieves a number from the specified memory address, increments the number by the amount specified in the command, and stores the result. Upon a successful completion, the memory controller chiplet 614 provides an indication of the command success to the application chiplet 610. Atomic operators avoid transmitting the data across the chiplet mesh network 624, resulting in lower latency execution of such commands.

Atomic operators can be classified as built-in atomics or programmable (e.g., custom) atomics. Built-in atomics are a finite set of operations that are immutably implemented in hardware. Programmable atomics are small programs that can execute on a programmable atomic unit (PAU) (e.g., a custom atomic unit (CAU)) of the memory controller chiplet 614.

The memory device chiplet 616 can be, or include any combination of, volatile memory devices or non-volatile memories. Examples of volatile memory devices include, but are not limited to, random access memory (RAM)—such as DRAM) synchronous DRAM (SDRAM), graphics double data rate type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device chiplet 616 as a chiplet, however, the device can reside elsewhere, such as in a different package on the peripheral board 604. For many applications, multiple memory device chiplets can be provided. In an example, these memory device chiplets can each implement one or multiple storage technologies, and may include integrated compute hosts. In an example, a memory chiplet can include, multiple stacked memory die of different technologies, for example one or more static random access memory (SRAM) devices stacked or otherwise in communication with one or more dynamic random access memory (DRAM) devices. In an example, the memory controller chiplet 614 can serve to coordinate operations between multiple memory chiplets in the chiplet system 602, for example, to use one or more memory chiplets in one or more levels of cache storage, and to use one or more additional memory chiplets as main memory. The chiplet system 602 can include multiple memory controller chiplet 614 instances, as can be used to provide memory control functionality for separate hosts, processors, sensors, networks, etc. A chiplet architecture, such as in the illustrated system, offers advantages in allowing adaptation to different memory storage technologies; and different memory interfaces, through updated chiplet configurations, such as without requiring redesign of the remainder of the system structure.

Figure 7:
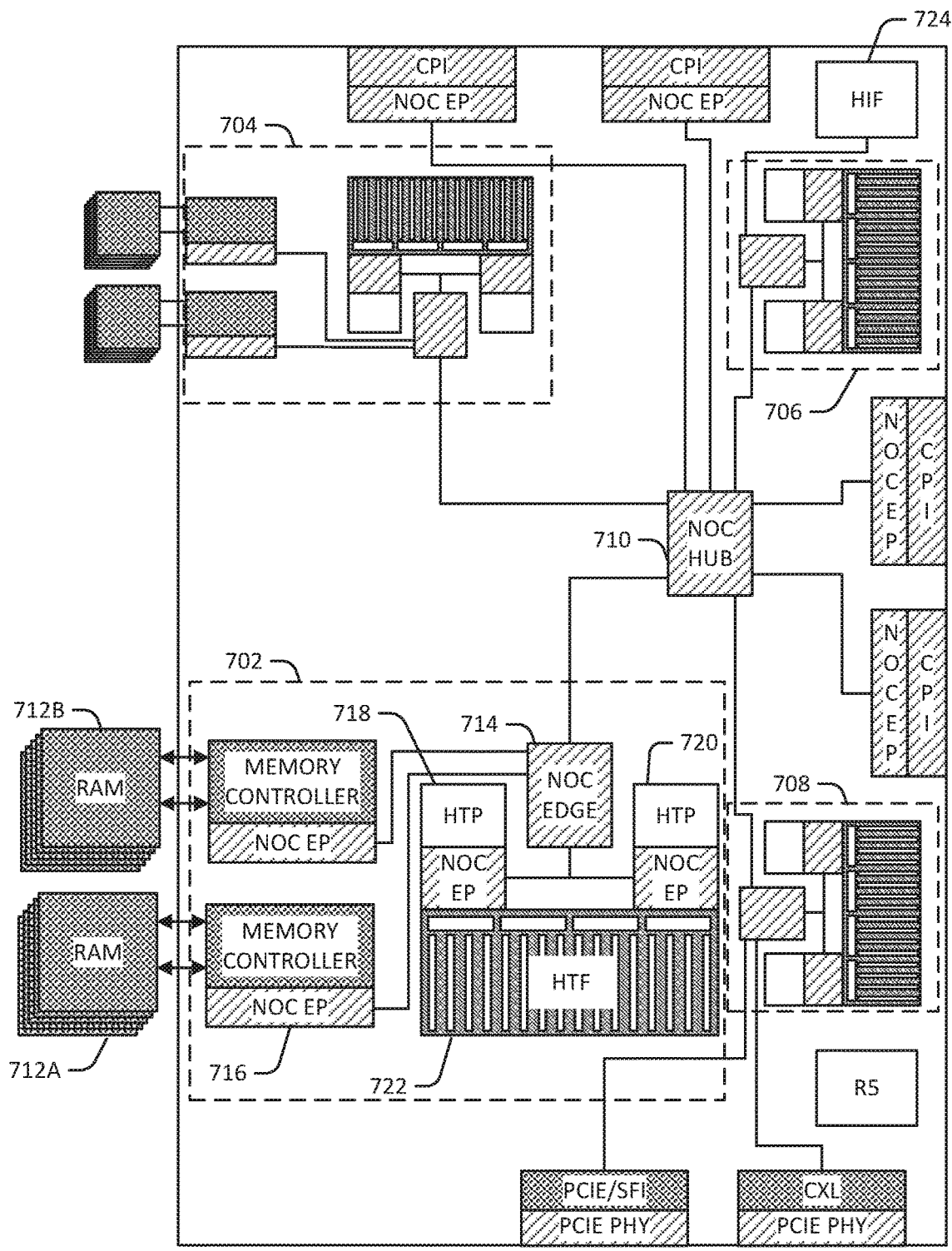
FIG. 7 illustrates generally an example of a chiplet-based implementation for a memory-compute device, according to an embodiment.

FIG. 7 illustrates generally an example of a chiplet-based implementation for a memory-compute device, according to an embodiment. The example includes an implementation with four compute-near-memory, or CNM, chiplets, and each of the CNM chiplets can include or comprise portions of the first memory-compute device 112 or the first memory-compute node 104 from the example of FIG. 1. The various portions can themselves include or comprise respective chiplets. The chiplet-based implementation can include or use CPI-based intra-system communications, as similarly discussed above in the example chiplet system 602 from FIG. 6A and FIG. 6B.

The example of FIG. 7 includes a first CNM package 700 comprising multiple chiplets. The first CNM package 700 includes a first chiplet 702, a second chiplet 704, a third chiplet 706, and a fourth chiplet 708 coupled to a CNM NOC hub 710. Each of the first through fourth chiplets can comprise instances of the same, or substantially the same, components or modules. For example, the chiplets can each include respective instances of an HTP accelerator, an HTF accelerator, and memory controllers for accessing internal or external memories.

In the example of FIG. 7, the first chiplet 702 includes a first NOC hub edge 714 coupled to the CNM NOC hub 710. The other chiplets in the first CNM package 700 similarly include NOC hub edges or endpoints. The switches in the NOC hub edges facilitate intra-chiplet, or intra-chiplet-system, communications via the CNM NOC hub 710.

The first chiplet 702 can further include one or multiple memory controllers 716. The memory controllers 716 can correspond to respective different NOC endpoint switches interfaced with the first NOC hub edge 714. In an example, the memory controller 716 comprises the memory controller chiplet 614 or comprises the memory controller 130, or comprises the memory subsystem 200, or other memory-compute implementation. The memory controllers 716 can be coupled to respective different memory devices, for example including a first external memory module 712a or a second external memory module 712b. The external memory modules can include, e.g., GDDR6 memories that can be selectively accessed by the respective different chiplets in the system.

The first chiplet 702 can further include a first HTP chiplet 718 and second HTP chiplet 720, such as coupled to the first NOC hub edge 714 via respective different NOC endpoint switches. The HTP chiplets can correspond to HTP accelerators, such as the HTP 140 from the example of FIG. 1, or the HTP accelerator 400 from the example of FIG. 4. The HTP chiplets can communicate with the HTF chiplet 722. The HTF chiplet 722 can correspond to an HTF accelerator, such as the HTF 142 from the example of FIG. 1, or the HTF 500 from the example of FIG. 5.

The CNM NOC hub 710 can be coupled to NOC hub instances in other chiplets or other CNM packages by way of various interfaces and switches. For example, the CNM NOC hub 710 can be coupled to a CPI interface by way of multiple different NOC endpoints on the first CNM package 700. Each of the multiple different NOC endpoints can be coupled, for example, to a different node outside of the first CNM package 700. In an example, the CNM NOC hub 710 can be coupled to other peripherals, nodes, or devices using CTCPI or other, non-CPI protocols. For example, the first CNM package 700 can include a PCIe scale fabric interface (PCIE/SFI) or a CXL interface (CXL) configured to interface the first CNM package 700 with other devices. In an example, devices to which the first CNM package 700 is coupled using the various CPI, PCIe, CXL, or other fabric, can make up a common global address space.

In the example of FIG. 7, the first CNM package 700 includes a host interface 724 (HIF) and a host processor (R5). The host interface 724 can correspond to, for example, the HIF 120 from the example of FIG. 1. The host processor, or R5, can correspond to the internal host processor 122 from the example of FIG. 1. The host interface 724 can include a PCI interface for coupling the first CNM package 700 to other external devices or systems. In an example, work can be initiated on the first CNM package 700, or a tile cluster within the first CNM package 700, by the host interface 724. For example, the host interface 724 can be configured to command individual HTF tile clusters, such as among the various chiplets in the first CNM package 700, into and out of power/clock gate modes.

Figure 8:
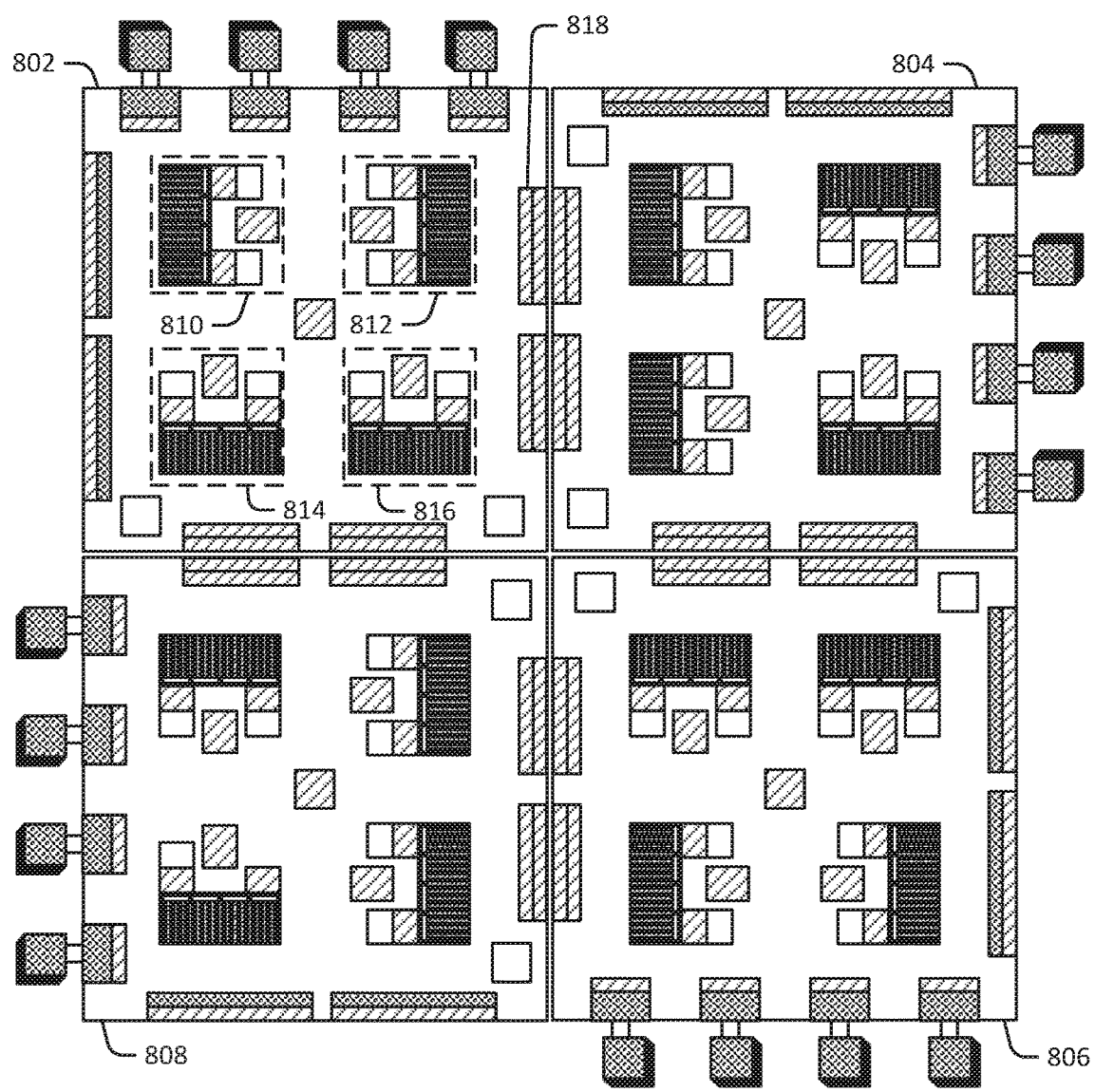
FIG. 8 illustrates an example tiling of memory-compute device chiplets, according to an embodiment.

FIG. 8 illustrates an example tiling of memory-compute devices, according to an embodiment. In FIG. 8, a tiled chiplet example 800 includes four instances of different compute-near-memory clusters of chiplets, where the clusters are coupled together. Each instance of a compute-near-memory chiplet can itself include one or more constituent chiplets (e.g., host processor chiplets, memory device chiplets, interface chiplets, and so on).

The tiled chiplet example 800 includes, as one or multiple of its compute-near-memory (CNM) clusters, instances of the first CNM package 700 from the example of FIG. 7. For example, the tiled chiplet example 800 can include a first CNM cluster 802 that includes a first chiplet 810 (e.g., corresponding to the first chiplet 702), a second chiplet 812 (e.g., corresponding to the second chiplet 704), a third chiplet 814 (e.g., corresponding to the third chiplet 706), and a fourth chiplet 816 (e.g., corresponding to the fourth chiplet 708). The chiplets in the first CNM cluster 802 can be coupled to a common NOC hub, which in turn can be coupled to a NOC hub in an adjacent cluster or clusters (e.g., in a second CNM cluster 804 or a fourth CNM cluster 808).

In the example of FIG. 8, the tiled chiplet example 800 includes the first CNM cluster 802, the second CNM cluster 804, a third CNM cluster 806, and the fourth CNM cluster 808. The various different CNM chiplets can be configured in a common address space such that the chiplets can allocate and share resources across the different tiles. In an example, the chiplets in the cluster can communicate with each other. For example, the first CNM cluster 802 can be communicatively coupled to the second CNM cluster 804 via an inter-chiplet CPI interface 818, and the first CNM cluster 802 can be communicatively coupled to the fourth CNM cluster 808 via another or the same CPI interface. The second CNM cluster 804 can be communicatively coupled to the third CNM cluster 806 via the same or other CPI interface, and so on.

In an example, one of the compute-near-memory chiplets in the tiled chiplet example 800 can include a host interface (e.g., corresponding to the host interface 724 from the example of FIG. 7) that is responsible for workload balancing across the tiled chiplet example 800. The host interface can facilitate access to host-based command request queues and response queues, such as from outside of the tiled chiplet example 800. The host interface can dispatch new threads of execution using hybrid threading processors and the hybrid threading fabric in one or more of the compute-near-memory chiplets in the tiled chiplet example 800.

As previously described, a hybrid threading fabric dataflow architecture may encode a program by laying out instructions over a two-dimensional array of tiles. To support conditional instructions, every ALU operation also outputs a condition code that the tile control logic can operate on. When the main path of execution would execute the ith instruction in the instruction RAM, when the condition code is false the control will select the ith+1 instruction instead. For this scheme to work efficiently, the program needs to be scheduled such that operations on the true branch are paired with operations on the false branch in time slots where enough hardware resources are available for either op. That is, both instructions are loaded onto a tile in the HTF and the tile executes the instruction based upon the result of the conditional. These instructions may be packed in a variety of different configurations, some configurations are more efficient than others. This invention describes methods for efficiently solving this packing problem.

Conditional code branches may be modeled as directed acyclic graphs (DAGs) which have a topological ordering. These DAGs may be used to construct a dynamic programming table to find a partial mapping of one path onto the other using dynamic programming algorithms. Traditional dynamic programming algorithms such as the Smith-Waterman algorithm, do not work on DAGs as they assume a single predecessor at each step (or one or more gaps). For example, the Smith-Waterman algorithm, which is used to perform local sequence alignment for two character strings, considers the left neighbor cell, diagonal left neighbor cell, and the top neighbor cell at each point of a scoring matrix as inputs to a scoring function to choose the mapping that produces the optimal score for that cell. When mapping two DAGs together, any node may have multiple incoming edges other than the previous neighbor. In fact, it is also possible that two adjacent nodes will not share an edge in the graph since a topological ordering does not imply all operations are dependent.

Disclosed in some examples, are systems, methods, devices, and machine readable mediums which use improved dynamic programming algorithms to pack conditional branch instructions. Conditional code branches may be modeled as directed acyclic graphs (DAGs) which have a topological ordering. These DAGs may be used to construct a dynamic programming table to find a mapping of one path onto the other path using dynamic programming algorithms. This mapping may be used to pack instructions for execution by the dataflow processors. In contrast to traditional dynamic programming algorithms, the present disclosure factors in the graph structures of the DAGs.

Figure 9:
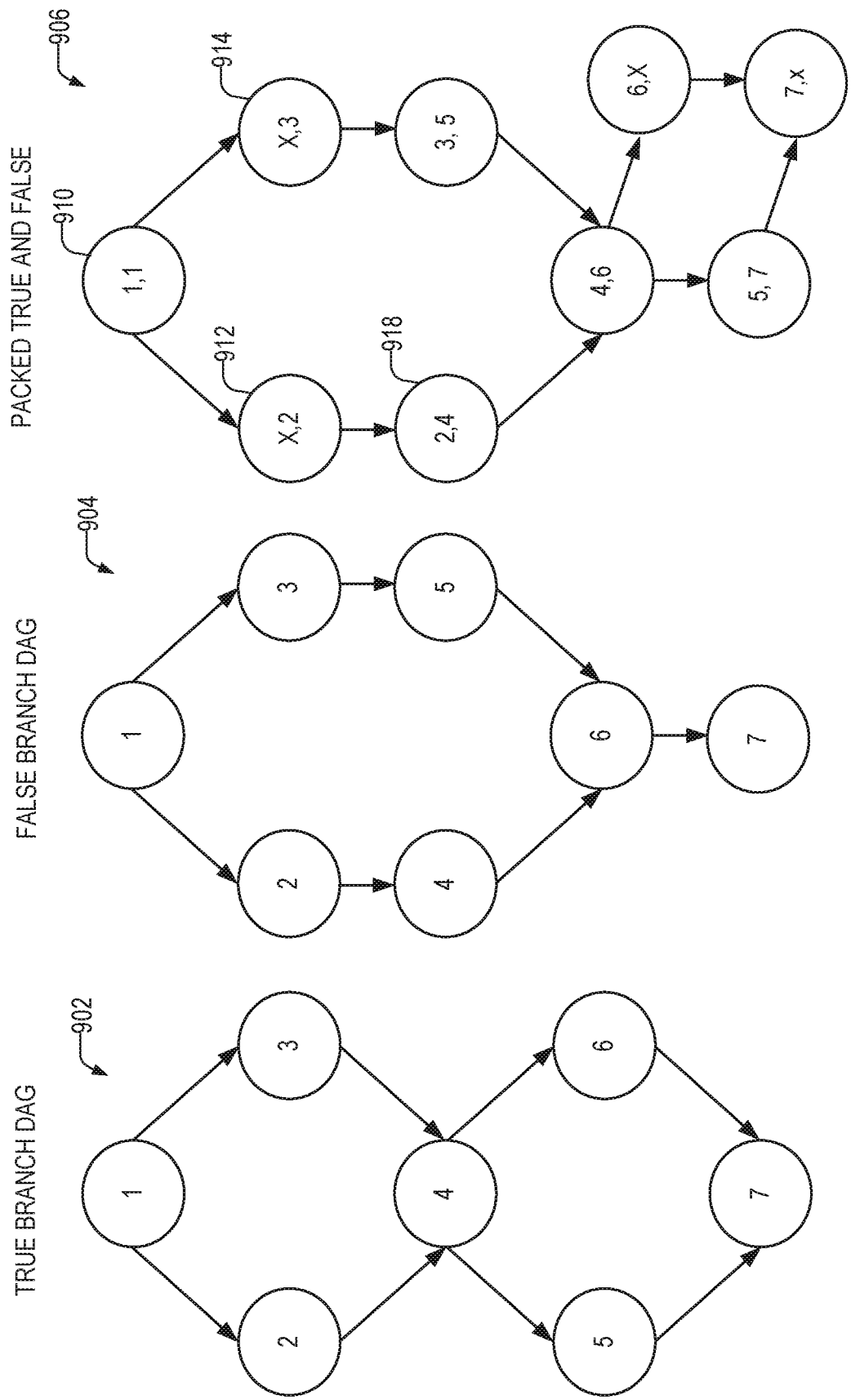
FIG. 9 illustrates three DAGs representing a true branch, a false branch, and an example packed instruction DAG according to some examples of the present disclosure.

FIG. 9 illustrates three DAGs representing a true branch 902, a false branch 904, and an example packed instruction DAG 906 according to some examples of the present disclosure. Nodes may be labelled based upon a same position and edges are data dependencies. Thus, node two depends on data from node one and so on. The true branch DAG 902 represents a directed acyclic graph of the true branch of a conditional. The false branch DAG 904 represents a directed acyclic graph of the false branch of the same conditional. The packed instruction DAG 906 shows a result of a packing operation that packs two instructions together. The notation in the packed instruction DAG 906 is (TRUE BRANCH NODE, FALSE BRANCH NODE). An "X" indicates no instruction is packed for a given DAG. For example, the first node 910, would execute either node one from the true branch or node one of the false branch (depending on the result of the conditional) is executed, but both are loaded into memory of the HTF tile. Node 912 packs a no-op instruction (X) and node two from the false branch DAG 904. Similarly, the node 914 packs a no-op instruction (X) and node three from the false branch DAG 904. Node 918 packs node two from true branch DAG 902 and node four from false branch DAG 904.

Figure 10:
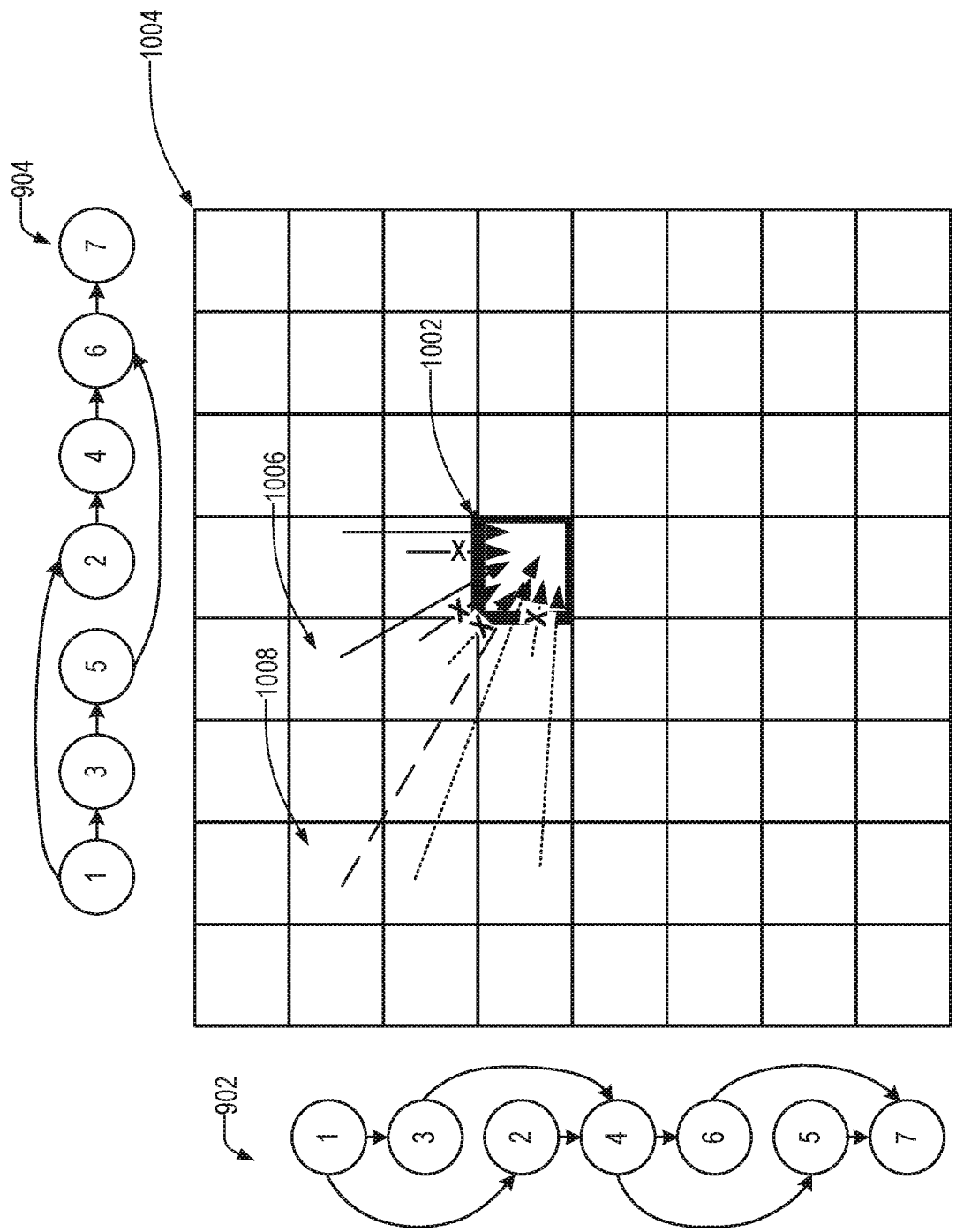
FIG. 10 illustrates a scoring matrix or table 1004 according to some examples of the present disclosure.

In one example implementation of a packing algorithm, the system utilizes a scoring matrix. FIG. 10 illustrates a scoring matrix or table 1004 according to some examples of the present disclosure. Each cell in the table (apart from the first row and column) corresponds to a particular node in the true branch DAG 902 and false branch DAG 904. When scoring a particular cell, a scoring function is used that considers scores from a set of previous cells that are selected based upon the structure of the graphs. The set of previous cells used comprises the union of the set of cells for the true DAG (where each node represents a row) that represent predecessor nodes in the true DAG and the set of cells for the false DAG representing predecessor nodes in the false DAG. In addition, skip nodes may also be added to the set. For the true DAG, these skip cells may be a cell directly to the left from the cells representing predecessor nodes. For the false DAG, these skip cells may be a cell directly above the cells representing predecessor nodes. The set of nodes for a hypothetical DAG mapping is shown in FIG. 10. The solid lines are previous cells considered for the true DAG 902 and the dotted lines are previous cells considered for the false DAG 904.

Nodes may be removed from the set of previous cells to use if the nodes represented by a particular previous cell and the nodes represented by the currently scored cell have no edges between them in the DAGs. For example, node 5 is not connected to node 2 in false DAG 904, thus the transition is shown in FIG. 10 with an "X" through it. Similarly, node 3 does not transition to node 2 in the true DAG 902, and thus the transition has an X through it and is not used.

For instances in which the nodes represented by a particular previous cell and the nodes represented by the currently scored cell have a single edge between them in the DAGs, then the node may still be kept in the set and may correspond to a situation in which a no-op is paired with another node. For example, consider the square 1006. Taking the diagonal move here implies matching 1 with 5, and then considering True(2), False(2) together. On the true side this is good because there is actually a connection between nodes 1 and 2, so we have a connection that preserves some of the dataflow structure. However, on the false branch, there is no connection between node 5 and node 2 so we are adding a connection that doesn't exist and will need a no-op somewhere to route the data. If there are no other good options, this is an allowable connection. However, if there are other moves without this problem, the algorithm will most likely be better off taking them.

For instances in which the nodes represented by a particular previous cell and the nodes represented by the currently scored cell have two edges between them in the DAGs (e.g., both the nodes in the true and false branch represented by the current cell have an edge to the nodes in the true and false branch represented by the particular previous cell, respectively), then that transition may be scored higher than if only one edge exists. The pruning of cells to consider is shown in FIG. 10 by the "X" marks through the arrows.

In some examples, the previous cells considered may include all the cells that represent predecessor nodes for the nodes represented by the presently scored cell and also skip opportunities for those cells. For example, in FIG. 10, using this method yields an additional cell to consider shown as dashed arrow 1008.

Finally, instead of only recording the optimal choice, the table also stores the best mapping per incoming edge. This is to enable the final traceback phase of the algorithm which will produce the final mapping. Since there may be several operations with multiple inputs coming in, the algorithm needs to produce at least that many paths coming out of this node to be able to map all operations in the DAG.

Figure 11:
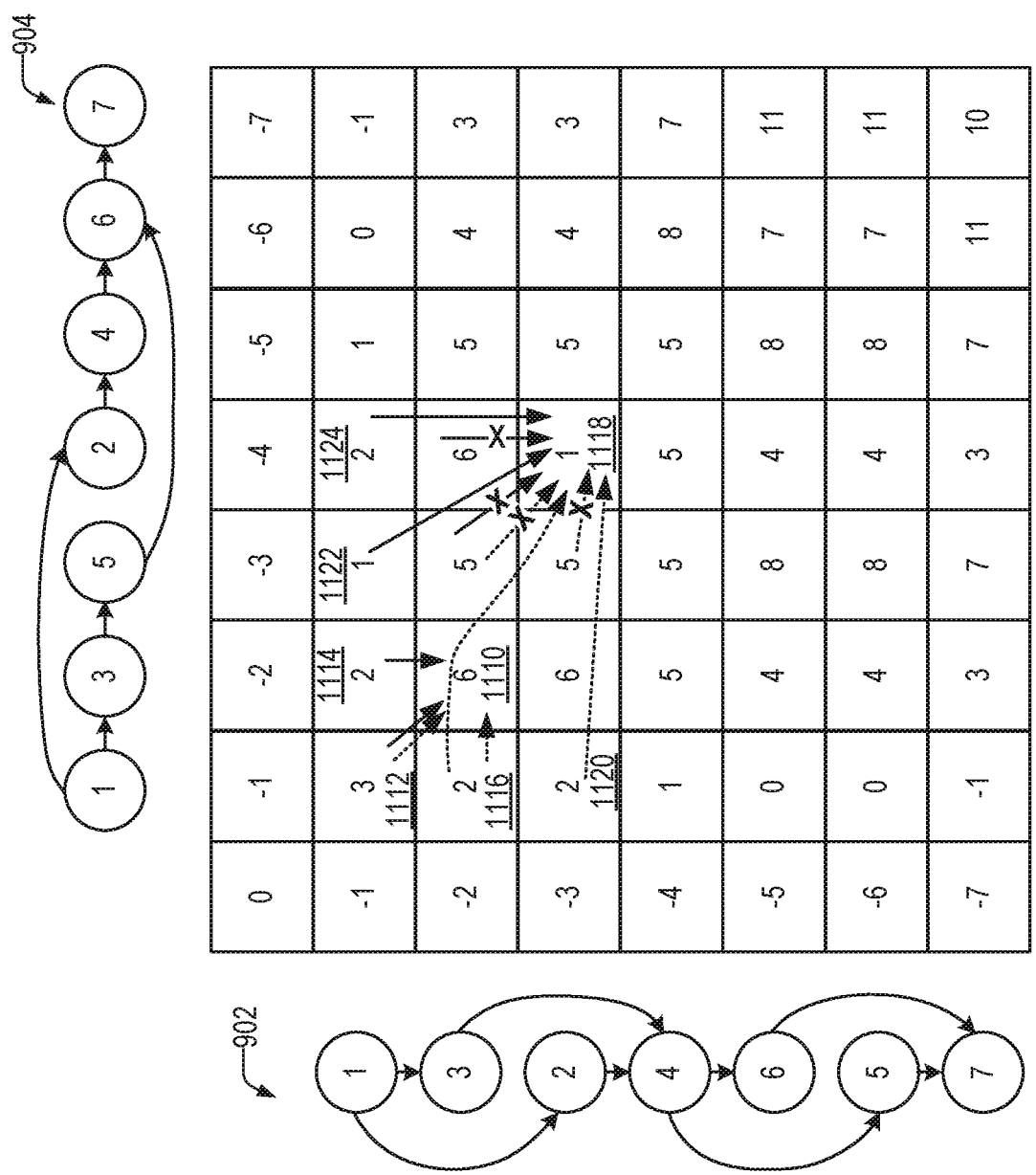
FIG. 11 illustrates a filled out scoring matrix according to some examples of the present disclosure.

FIG. 11 illustrates application of a scoring function according to some examples of the present disclosure. This scoring function utilizes the global alignment (Needleman-Wunsch) scoring where the first row and column utilize the gap penalty (which increases for every gap). The scoring function of FIG. 11 has a gap penalty of one; a score of plus two for diagonal moves if the number of incoming edges of the true DAG equals the number of incoming edges of the false DAG; a penalty of minus two for diagonal moves if the number of incoming edges of the true DAG does not equal the number of incoming edges of the false DAG; a bonus of one if the total incoming nodes of both branches is less than or equal to four; a no-link penalty of five if there is no connection from the previous node to the current node. As noted previously a match is determined based upon a scoring function of aligning nodes in the true DAG and the node in the false DAG represented by the cell in the scoring table. Additionally, there is a no-match penalty of minus five for transitions that do not have links in the graph to both the predecessor nodes.

As an example, the score of cell 1110 is calculated based upon the set of previous nodes (shown by the arrows starting at each node in the set and ending at node 1110). The score may be the maximum of:
The score of node 1112 of three
Node three of the true DAG 902 has one incoming edge and node three of false DAG has one incoming edge, so the score is plus two;
The total incoming edges of DAG 902 is one and DAG 904 is one so a total of two, and two is less than four, so we have a bonus of one;
The score is 3+2+1=6
The score of node 1114 of two
The total incoming edges of DAG 902 is one and DAG 904 is one so a total of two, and two is less than four, so we have a bonus of one;
The gap penalty is two because we are not incrementing false DAG 904.
The score is 2+1−2=1
The score of node 1116 of two The total incoming edges of DAG 902 is one and DAG 904 is one so a total of two, and two is less than four, so we have a bonus of one;
The gap penalty is two because we are not incrementing false DAG 904.
The score is 2+1−2=1
Because the maximum score is six, this score is used and entered into cell 1110.

Another example of scoring is cell 1118 (shown in FIG. 10) where the score of the cell (one) is computed based upon the maximum of the scores of previous cells. For example, the maximum of:
cell 1120 which has a score of two
The total incoming edges of DAG 902 is one and DAG 904 is one so a total of two, and two is less than four, so we have a bonus of one;
The gap penalty is two.
The score is 2+1−2=1
cell 1116 which has a score of two
Node two of the true DAG 902 has one incoming edge and node two of false DAG has one incoming edge, so the score is plus two;
The total incoming edges of DAG 902 is one and DAG 904 is one so a total of two, and two is less than four, so we have a bonus of one;
Since node 3 of the DAG 902 is not connected to node two directly, there is a minus five no-link penalty;
The score is 2+2+1−5=0;
cell 1122 has a score of one (−1)
Node two of the true DAG 902 has one incoming edge and node two of false DAG has one incoming edge, so the score is plus two;
The total incoming edges of DAG 902 is one and DAG 904 is one so a total of two, and two is less than four, so we have a bonus of one;
Since node 3 of the DAG 902 is not connected to node two directly, there is a minus five no-link penalty;
The score is 1+2+1−5=−1;
cell 1124 which has a score of two
The total incoming edges of DAG 902 is one and DAG 904 is one so a total of two, and two is less than four, so we have a bonus of one;
The gap penalty is two.
The score is 2+1−2=1
Since the maximum score is one, this score is entered into the table. Now, in some examples, all incoming edges from predecessor nodes may be considered. That is, node 1112 may also be considered. In that case:
cell 1112 has a score of three
Node two of the true DAG 902 has one incoming edge and node two of false DAG has one incoming edge, so the score is plus two;
The total incoming edges of DAG 902 is one and DAG 904 is one so a total of two, and two is less than four, so we have a bonus of one;
Since both links are connected, there is no no-link penalty;
The score is 3+1+2=6;
Once the scoring table is done, the algorithm backtracks to create the mapping. In the backtrack phase, in some examples using a local alignment the backtrack starts with the highest scoring cell and works back by considering each scoring table cell where there is an incoming edge on each graph and each upper and left neighboring cell (for scenarios where a no-operation scores higher). The highest score for each considered cell is then chosen and the algorithm then considers each scoring table cell where there is an incoming edge on the graph for that cell and the upper and left neighboring cells of that cell, and so on until the algorithm reaches the beginning of the mapping (e.g., a cell with a zero).

In another backtracking algorithm using global alignment, the algorithm starts with the end cell (e.g., the cell with the value of ten in FIG. 13) that is in the lower right hand corner. The traditional algorithms only store the score in a cell. As noted, the present system records both the maximum score, and the list of incoming candidates sorted by score for later use in backtracking. Traditional sequence alignment backtracking picks a final candidate (global alignment starts with lower-right candidate, local alignment starts at cell with max score) and simply follows the best scores back to the start (for global alignment that means the upper left corner, for local alignment, when the system reaches the first 0).

Since we have DAGs with multiple paths, the backtracking algorithm of the present system may use a double ended queue to hold candidates. The starting condition is the same, but when the system comes to a cell with multiple incoming paths, all the candidates after the best score are added to the double ended queue. This ensures that after the system has finished following the main mapping back to the start, it can pick back up with a second best candidate to map alternate paths. The system may only map nodes that haven't been mapped yet, so the start of the loop that pulls from the front of the double ended queue drops candidates that have already had their nodes mapped. This is kind of like a sieve—the queue will get filled with candidates, but as the system follows the first path back, the cells will be locked in place and don't change. The deque will drain most candidates as already mapped, but some of the alternate paths will still be open so the system will be able to follow them back. Eventually no new changes will be open so the candidate list will stay empty and terminate the loop.

Figure 12:
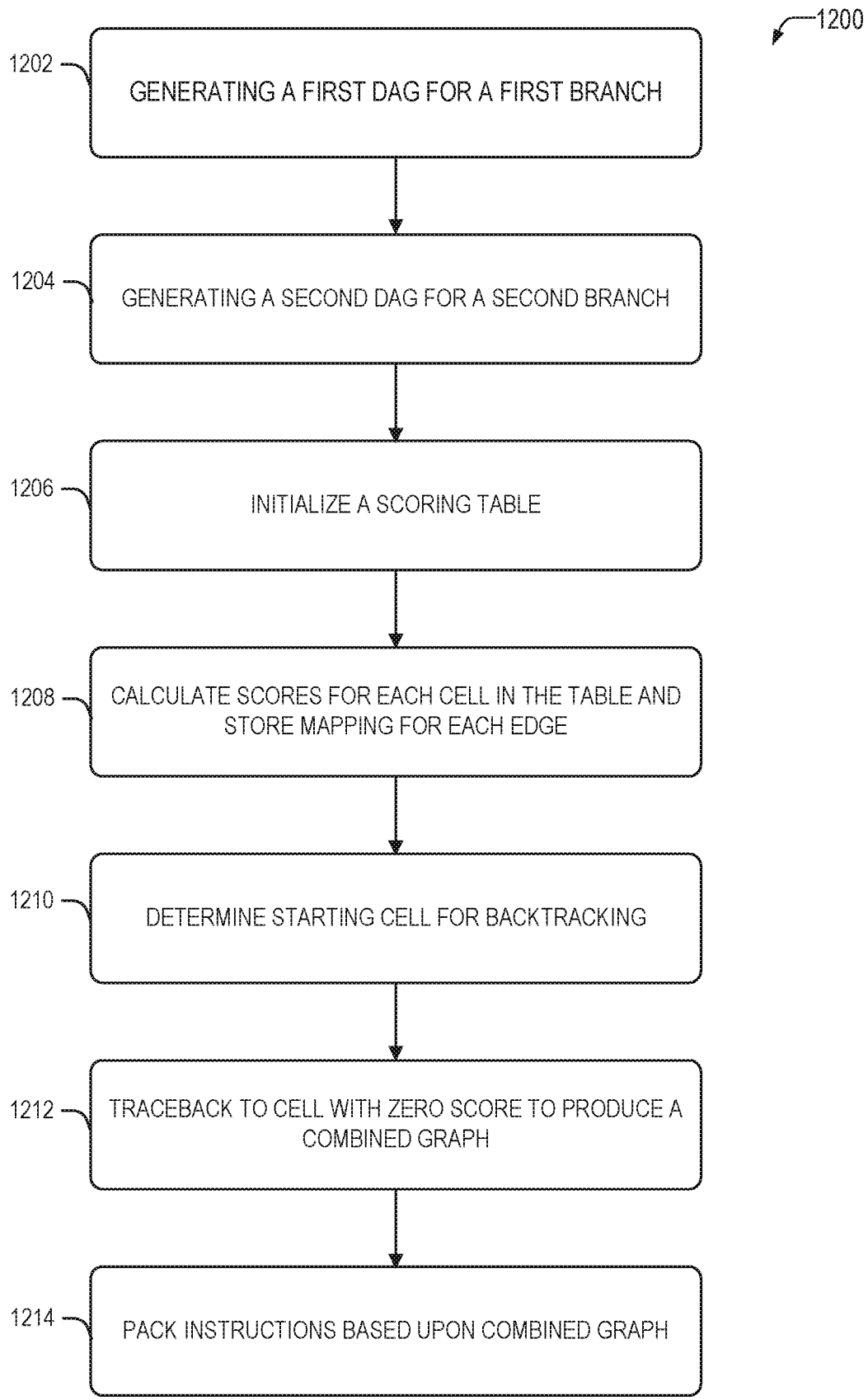
FIG. 12 illustrates a flowchart of a method of determining an instruction packing according to some examples of the present disclosure.

FIG. 12 illustrates a flowchart of a method 1200 of determining an instruction packing according to some examples of the present disclosure. In some examples, the method 1200 may be done during compile time of code to be executed on an HTF or other Course Grained Reconfigurable Array (CGRA). A CGRA is an array of a large number of processing elements (also called tiles) interconnected by a mesh network. The Hybrid Threading Fabric (HTF) is a type of Course Grain Reconfigurable Array (CGRA) in which the tiles are connected in a grid configuration with each tile connected to its horizontal and vertical neighbors. At operation 1202 the system generates a first DAG for a first branch of a first portion of operating code. The operating code may be code that is to be executed by an HTF. The first portion may be a first branch of a conditional statement of the operating code. At operation 1204, the system may generate a second DAG for a second branch of the first portion of operating code. For example, the DAGs may be portions of an Abstract Syntax Tree (AST) created by a compiler that contain conditional portions. The second portion may be a second branch of the conditional statement of the operating code.

At operation 1206 a scoring table may be initialized. For example, all the cells may be set to a zero value. In other examples, the first row and column may be set based upon a gap penalty (e.g., assuming a −2 gap penalty, the first row and column may be 0, −2, −4, −6, . . . . , and so on). At operation 1208, the system, for each particular cell in the scoring table corresponding to a first node in the first graph and a second node in the second graph, calculate a score. For example, the score may be calculated as previously explained, such as using a scoring function that may utilize a gap penalty, a comparison of a property of the first and second nodes, and using scores in one or more previously scored cells in the scoring table corresponding to nodes in the first and second graphs connected by at least one edge to the first and second nodes respectively. For example, the property of the first and second nodes may be a number of incoming edges into those nodes. In some examples, the source cells for the highest score may be stored along with the score to facilitate traceback.

At operation 1210, the system may determine a starting cell for the backtracking procedure. In some examples, this may be the cell at position [x][y] where x is the number of nodes in the first branch and y is the number of nodes in the second branch. In other examples, the starting cell may be a cell with the maximum score.

At operation 1212, the system may perform the traceback operation. As previously described, in some examples, a data structure such as a double ended queue is used to process a candidate list (which is initialized as before). As the traceback maps a cell, if it has incoming paths for multiple predecessor nodes, then the sorted list of candidates stored in the scoring table's cell are added to the candidate list. Once the system has finished tracing back to the starting positing, another candidate is pulled to start mapping alternate paths. If the nodes that a candidate considers are already mapped, this candidate is dropped. This filtering step guarantees forward progress and that maximal scores will be selected first. When the candidate list is empty, all possible open routes in the DAG have been considered.

In another backtracking algorithm, the algorithm starts with the end cell (e.g., the cell with the value of ten in FIG. 13) that is in the lower right hand corner. The system then goes to the next cell indicated by the cells where the highest score originated from that are stored in the scoring table. Cells with multiple predecessor cells stored indicate multiple possibilities of equal score. In some examples, the system may choose one path, or may consider all paths of equal score and chose the path with the highest total score. As noted previously, each traceback path needs to make sure that the structure of each of the DAGs is respected.

At operation 1214, the system may pack the instructions based upon the combined graph generated at operation 1212. Nodes that are packed together in the combined graph may be packed together as instructions loaded into memory of a HTF processing element. Nodes of a branch not packed with nodes of the other branch are packed with a "no-operation" instruction.

Figure 13:
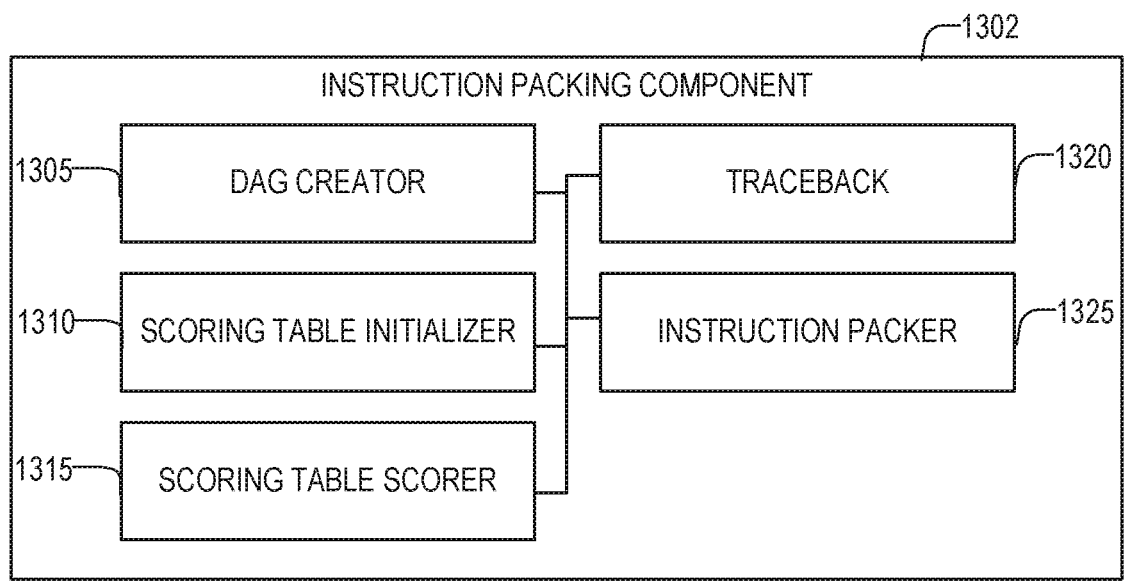
FIG. 13 illustrates a schematic of an instruction packing component according to some examples of the present disclosure.

FIG. 13 illustrates a schematic of an instruction packing component 1302 according to some examples of the present disclosure. DAG creator 1305 creates one or more directed acyclic graphs (DAGs) based upon code (e.g., source code) that is to be executed by the HTF. Scoring table initializer 1310 may create a scoring table data structure and initialize it as previously described. The scoring table may have a number of rows corresponding to a number of nodes of first DAG and a number of columns corresponding to a number of nodes of the second DAG produced by the DAG creator 1305. Scoring table scorer 1315 may, using the DAGs produced by the DAG creator 1305 and the scoring table produced by the scoring table initializer, fill in the scoring table using a scoring function as previously described. Traceback component 1320 may use the filled in scoring table and the DAGs and traceback through the scoring table as previously described to produce a combined graph. Instruction packer 1325 may pack instructions together based upon the combined graph created by the traceback component 1320. Components of FIG. 13 may be hardware components, or may be software components, such as individual processes, applications, functions, software classes, or the like. The structure of FIG. 13 is exemplary and one of ordinary skill in the art will understand that the functions provided by one or more of the components may be combined, split, or otherwise provided for in a manner different than that shown. FIG. 13 may be implemented by the machine 1400 in FIG. 14, may be implemented in any of the components of FIGS. 1-8, and the like.

The present disclosure thus solves a technical problem of wasted instruction cycles by traditional packing algorithms that pack conditional instructions for execution by processing nodes of a CGRA. These wasted instruction cycles reduce performance of the CGRA. This technical problem is solved by the technical solution of using a modified dynamic programming algorithm that automatically packs the instructions more efficiently to reduce wasted cycles. This reduction in wasted cycles increases the speed at which the CGRA processes an instruction set and therefore increases the performance of the CGRA hardware resources. The present disclosure thus solves a technical problem using a technical solution and thus improves the functioning of the CGRA computing system.

Figure 14:
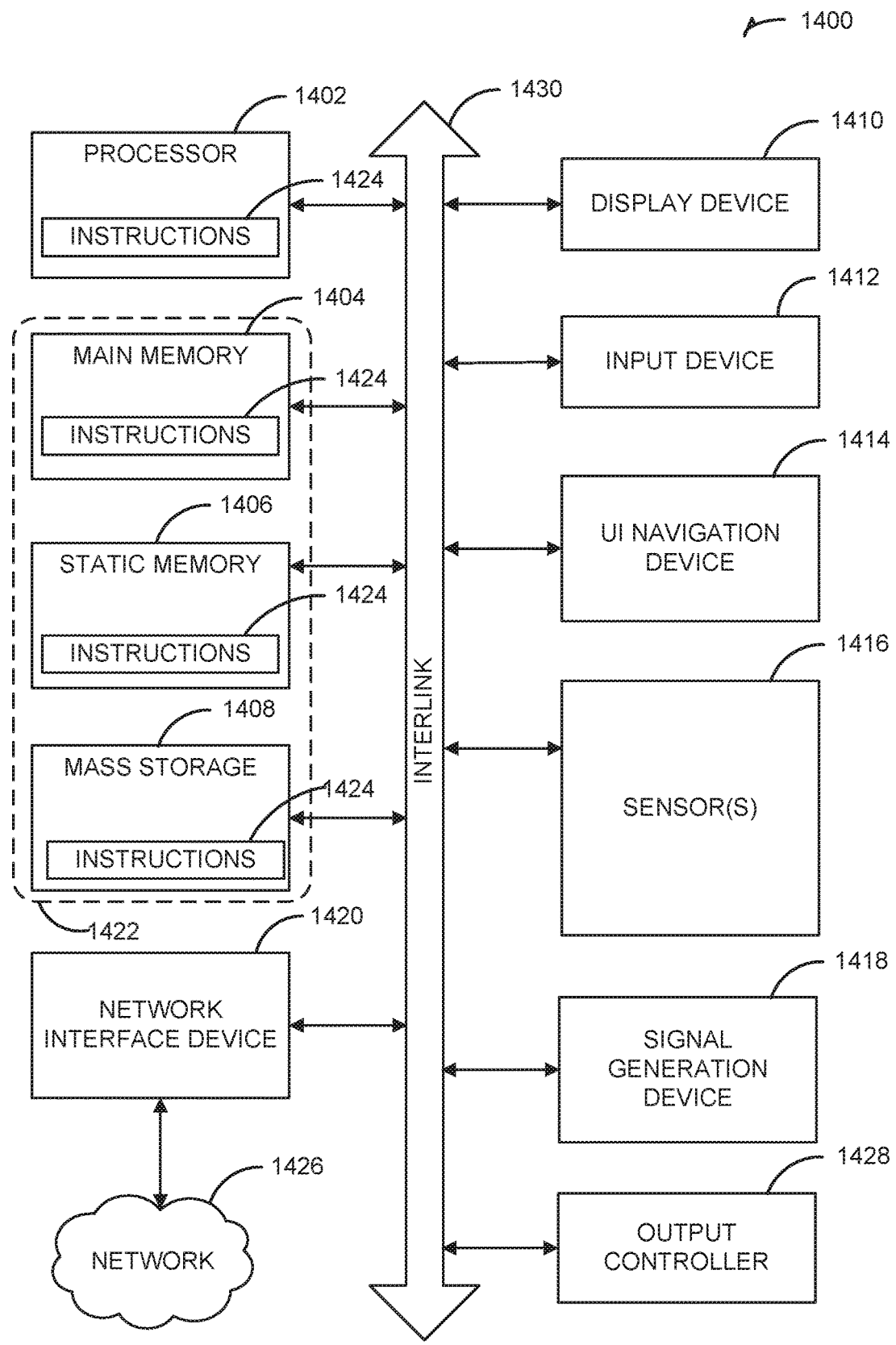
FIG. 14 illustrates a block diagram of an example machine 1600 with which, in which, or by which any one or more of the techniques (e.g., methodologies) discussed herein can be implemented.

FIG. 14 illustrates a block diagram of an example machine 1400 with which, in which, or by which any one or more of the techniques (e.g., methodologies) discussed herein can be implemented. Examples, as described herein, can include, or can operate by, logic or a number of components, or mechanisms in the machine 1400. Circuitry (e.g., processing circuitry) is a collection of circuits implemented in tangible entities of the machine 1400 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 1400.

In alternative embodiments, the machine 1400 can operate as a standalone device or can be connected (e.g., networked) to other machines. In a networked deployment, the machine 1400 can operate in the capacity of a server machine, a client machine, or both in server-client network environments. In an example, the machine 1400 can act as a peer machine in peer-to-peer (P2P) (or other distributed) network environment. The machine 1400 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine 1400 (e.g., computer system) can include a hardware processor 1402 (e.g., a central processing unit (CPU), a graphics processing unit (GPU), a hardware processor core, or any combination thereof), a main memory 1404, a static memory 1406 (e.g., memory or storage for firmware, microcode, a basic-input-output (BIOS), unified extensible firmware interface (UEFI), etc.), and mass storage device 1408 (e.g., hard drives, tape drives, flash storage, or other block devices) some or all of which can communicate with each other via an interlink 1430 (e.g., bus). The machine 1400 can further include a display device 1410, an alphanumeric input device 1412 (e.g., a keyboard), and a user interface (UI) Navigation device 1414 (e.g., a mouse). In an example, the display device 1410, the input device 1412, and the UI navigation device 1414 can be a touch screen display. The machine 1400 can additionally include a mass storage device 1408 (e.g., a drive unit), a signal generation device 1418 (e.g., a speaker), a network interface device 1420, and one or more sensor(s) 1416, such as a global positioning system (GPS) sensor, compass, accelerometer, or other sensor. The machine 1400 can include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the hardware processor 1402, the main memory 1404, the static memory 1406, or the mass storage device 1408 can be, or include, a machine-readable media 1422 on which is stored one or more sets of data structures or instructions 1424 (e.g., software) embodying or used by any one or more of the techniques or functions described herein. The instructions 1424 can also reside, completely or at least partially, within any of registers of the hardware processor 1402, the main memory 1404, the static memory 1406, or the mass storage device 1408 during execution thereof by the machine 1400. In an example, one or any combination of the hardware processor 1402, the main memory 1404, the static memory 1406, or the mass storage device 1408 can constitute the machine-readable media 1422. While the machine-readable media 1422 is illustrated as a single medium, the term "machine-readable medium" can include a single medium or multiple media (e.g., a centralized or distributed database, or associated caches and servers) configured to store the one or more instructions 1424.

The term "machine readable medium" can include any medium that is capable of storing, encoding, or carrying instructions for execution by the machine 1400 and that cause the machine 1400 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine-readable media 1422 can be representative of the instructions 1424, such as instructions 1424 themselves or a format from which the instructions 1424 can be derived. This format from which the instructions 1424 can be derived can include source code, encoded instructions (e.g., in compressed or encrypted form), packaged instructions (e.g., split into multiple packages), or the like. The information representative of the instructions 1424 in the machine-readable media 1422 can be processed by processing circuitry into the instructions to implement any of the operations discussed herein. For example, deriving the instructions 1424 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1424.

In an example, the derivation of the instructions 1424 can include assembly, compilation, or interpretation of the information (e.g., by the processing circuitry) to create the instructions 1424 from some intermediate or preprocessed format provided by the machine-readable media 1422. The information, when provided in multiple parts, can be combined, unpacked, and modified to create the instructions 1424. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1424 can be further transmitted or received over a communications network 1426 using a transmission medium via the network interface device 1420 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1420 can include one or more physical jacks (e.g., Ethernet, coaxial, or phone jacks) or one or more antennas to connect to the network 1426. In an example, the network interface device 1420 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1400, and includes digital or analog communications signals or other intangible medium to facilitate communication of such software. A transmission medium is a machine readable medium.

To better illustrate the methods and apparatuses described herein, a non-limiting set of Example embodiments are set forth below as numerically identified Examples.

Example 1 is a device comprising: a processor; a memory, the memory storing instructions, which when executed by the processor, causing the processor to execute operations comprising: reading operating code from a memory device; generating, in the memory device, a first directed acyclic graph data structure from a portion of operating code, the first directed acyclic graph modeling a program flow of a first branch of a conditional statement of the code; generating, in the memory device, a second directed acyclic graph data structure from the portion of operating code, the second directed acyclic graph modeling a program flow of a second branch of the conditional statement; initializing, in the memory device, a scoring table data structure, the scoring table data structure comprising a plurality of cells that are defined by a number of columns corresponding to the number of nodes in the first directed acyclic graph data structure and a number of rows corresponding to the number of nodes in the second directed acyclic graph data structure; for each cell in the scoring table data structure corresponding to a first node in the first directed acyclic graph data structure and a second node in the second directed acyclic graph data structure, writing to the memory device, a score calculated based upon a scoring function using scores in one or more previously scored cells in the scoring table data structure corresponding to nodes in the first and second directed acyclic graph data structures connected by at least one edge to the first and second nodes respectively; storing, in the memory device, for each cell in the scoring table data structure, an identifier of a best mapping per incoming edge of the first and second nodes; determining a starting cell in the scoring table data structure for a backtrack procedure; tracing back from the cell with the highest score using the identifier of the best mapping to produce a combined graph; and packing a set of instructions in object code based upon the combined graph, the object code configured, upon execution in a coarse grained reconfigurable array, to cause conditional execution of instructions in the set of instructions at a processing unit of the coarse grained reconfigurable array.

In Example 2, the subject matter of Example 1 includes, wherein the operations of initializing the scoring table data structure comprises initializing the first row and column of the scoring table data structure with zero values.

In Example 3, the subject matter of Examples 1-2 includes, wherein the operations of initializing the scoring table data structure comprises initializing the first row and column of the scoring table data structure with a gap penalty.

In Example 4, the subject matter of Examples 1-3 includes, wherein the scoring function is a maximum score between: a sum of a score of a first previous cell that represents a previous node that is connected in the first directed acyclic graph data structure to the first node and a second previous cell that represents a second previous node that is connected in the second directed acyclic graph data structure to the second node and a similarity score of the first and second nodes; a sum of the score of the first previous cell and a gap penalty; and a sum of the score of the second previous cell and the gap penalty.

In Example 5, the subject matter of Example 4 includes, wherein the gap penalty increases for each successive gap.

In Example 6, the subject matter of Examples 1-5 includes, wherein the operations further comprise, executing the packed instructions on a hybrid threading fabric (HTF).

In Example 7, the subject matter of Examples 1-6 includes, wherein the operations further comprise determining an unmapped node of the first directed acyclic graph data structure in the combined graph, and responsive to determining an unmapped node, packing the unmapped mode with an instruction having a gap.

Example 8 is a method comprising: reading operating code from a memory device; generating, in the memory device, a first directed acyclic graph data structure from a portion of operating code, the first directed acyclic graph modeling a program flow of a first branch of a conditional statement of the code; generating, in the memory device, a second directed acyclic graph data structure from the portion of operating code, the second directed acyclic graph modeling a program flow of a second branch of the conditional statement; initializing, in the memory device, a scoring table data structure, the scoring table data structure comprising a plurality of cells that are defined by a number of columns corresponding to the number of nodes in the first directed acyclic graph data structure and a number of rows corresponding to the number of nodes in the second directed acyclic graph data structure; for each cell in the scoring table data structure corresponding to a first node in the first directed acyclic graph data structure and a second node in the second directed acyclic graph data structure, writing to the memory device, a score calculated based upon a scoring function using scores in one or more previously scored cells in the scoring table data structure corresponding to nodes in the first and second directed acyclic graph data structures connected by at least one edge to the first and second nodes respectively; storing, in the memory device, for each cell in the scoring table data structure, an identifier of a best mapping per incoming edge of the first and second nodes; determining a starting cell in the scoring table data structure for a backtrack procedure; tracing back from the cell with the highest score using the identifier of the best mapping to produce a combined graph; and packing a set of instructions in object code based upon the combined graph, the object code configured, upon execution in a coarse grained reconfigurable array, to cause conditional execution of instructions in the set of instructions at a processing unit of the coarse grained reconfigurable array.

In Example 9, the subject matter of Example 8 includes, wherein initializing the scoring table data structure comprises initializing the first row and column of the scoring table data structure with zero values.

In Example 10, the subject matter of Examples 8-9 includes, wherein initializing the scoring table data structure comprises initializing the first row and column of the scoring table data structure with a gap penalty.

In Example 11, the subject matter of Examples 8-10 includes, wherein the scoring function is a maximum score between: a sum of score of a first previous cell that represents a previous node that is connected in the first directed acyclic graph data structure to the first node and a second previous cell that represents a second previous node that is connected in the second directed acyclic graph data structure to the second node and a similarity score of the first and second nodes; a sum of the score of the first previous cell and a gap penalty; and a sum of the score of the second previous cell and the gap penalty.

In Example 12, the subject matter of Example 11 includes, wherein the gap penalty increases for each successive gap.

In Example 13, the subject matter of Examples 8-12 includes, executing the packed instructions on a hybrid threading fabric (HTF).

In Example 14, the subject matter of Examples 8-13 includes, determining an unmapped node of the first directed acyclic graph data structure in the combined graph, and responsive to determining an unmapped node, packing the unmapped mode with an instruction having a gap.

Example 15 is a non-transitory machine-readable medium, storing instructions, which when executed by a machine, cause the machine to perform operations comprising: reading operating code from a memory device; generating, in the memory device, a first directed acyclic graph data structure from a portion of operating code, the first directed acyclic graph modeling a program flow of a first branch of a conditional statement of the code; generating, in the memory device, a second directed acyclic graph data structure from the portion of operating code, the second directed acyclic graph modeling a program flow of a second branch of the conditional statement; initializing, in the memory device, a scoring table data structure, the scoring table data structure comprising a plurality of cells that are defined by a number of columns corresponding to the number of nodes in the first directed acyclic graph data structure and a number of rows corresponding to the number of nodes in the second directed acyclic graph data structure; for each cell in the scoring table data structure corresponding to a first node in the first directed acyclic graph data structure and a second node in the second directed acyclic graph data structure, writing to the memory device, a score calculated based upon a scoring function using scores in one or more previously scored cells in the scoring table data structure corresponding to nodes in the first and second directed acyclic graph data structures connected by at least one edge to the first and second nodes respectively; storing, in the memory device, for each cell in the scoring table data structure, an identifier of a best mapping per incoming edge of the first and second nodes; determining a starting cell in the scoring table data structure for a backtrack procedure; tracing back from the cell with the highest score using the identifier of the best mapping to produce a combined graph; and packing a set of instructions in object code based upon the combined graph, the object code configured, upon execution in a coarse grained reconfigurable array, to cause conditional execution of instructions in the set of instructions at a processing unit of the coarse grained reconfigurable array.

In Example 16, the subject matter of Example 15 includes, wherein the operations of initializing the scoring table data structure comprises initializing the first row and column of the scoring table data structure with zero values.

In Example 17, the subject matter of Examples 15-16 includes, wherein the operations of initializing the scoring table data structure comprises initializing the first row and column of the scoring table data structure with a gap penalty.

In Example 18, the subject matter of Examples 15-17 includes, wherein the scoring function is a maximum score between: a sum of a score of a first previous cell that represents a previous node that is connected in the first directed acyclic graph data structure to the first node and a second previous cell that represents a second previous node that is connected in the second directed acyclic graph data structure to the second node and a similarity score of the first and second nodes; a sum of the score of the first previous cell and a gap penalty; and a sum of the score of the second previous cell and the gap penalty.

In Example 19, the subject matter of Example 18 includes, wherein the gap penalty increases for each successive gap.

In Example 20, the subject matter of Examples 15-19 includes, wherein the operations further comprise, executing the packed instructions on a hybrid threading fabric (HTF).

In Example 21, the subject matter of Examples 15-20 includes, wherein the operations further comprise determining an unmapped node of the first directed acyclic graph data structure in the combined graph, and responsive to determining an unmapped node, packing the unmapped mode with an instruction having a gap.

Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a method to implement of any of Examples 1-21.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A device comprising:
   a processor;
   a memory, the memory storing instructions, which when executed by the processor, causing the processor to execute operations comprising:
   reading operating code from a memory device;
      generating a first directed acyclic graph data structure from a portion of the operating code, the first directed acyclic graph data structure modeling a program flow of a first branch of a conditional statement of the operating code;
      generating a second directed acyclic graph data structure from the portion of the operating code, the second directed acyclic graph data structure modeling a program flow of a second branch of the conditional statement;
      initializing a scoring table data structure, the scoring table data structure comprising a plurality of columns based upon a number of nodes in the first directed acyclic graph data structure and a plurality of rows based upon a number of nodes in the second directed acyclic graph data structure;
      for a plurality of respective cells in the scoring table data structure corresponding to a particular node in the first directed acyclic graph data structure and a particular node in the second directed acyclic graph data structure, calculating a score based upon a scoring function, the scoring function using as input scores from one or more previously scored cells in the scoring table data structure corresponding to other nodes in the first and second directed acyclic graph data structures connected to the particular node in the first directed acyclic graph data structure and the particular node in the second directed acyclic graph data structure by at least one edge;
      storing, in the scoring table data structure, for each of the plurality of respective cells, an identifier of a mapping with a best score per incoming edge;
   determining a starting cell in the scoring table data structure for a backtrack procedure, the backtrack procedure tracing back from the cell with a highest score using the identifier of the mapping with the best score to produce a combined graph; and
   creating object code of the operating code based upon the combined graph, the object code configured, upon execution in a coarse grained reconfigurable array, to cause conditional execution of instructions in the operating code at a processing unit of the coarse grained reconfigurable array.

2. The device of claim 1, wherein the operations of initializing the scoring table data structure comprises setting a first row and a first column of the scoring table data structure with a specified value.

3. The device of claim 2, wherein the specified value is a negative value.

4. The device of claim 1, wherein the scoring function is a maximum score of:
   a sum of a score of a first previous cell that represents a previous node that is connected in the first directed acyclic graph data structure to a first node in the first directed acyclic graph data structure and a second previous cell that represents a second previous node that is connected in the second directed acyclic graph data structure to a second node in the second directed acyclic graph data structure and a similarity score of the first and second nodes;
   a sum of the score of the first previous cell and a gap penalty; and
   a sum of the score of the second previous cell and the gap penalty.

5. The device of claim 4, wherein the gap penalty increases for each successive gap.

6. The device of claim 1, wherein the operations further comprise, causing execution of the object code on processors of a hybrid threading fabric (HTF).

7. The device of claim 1, wherein the operations further comprise determining an unmapped node of the first directed acyclic graph data structure in the combined graph, and responsive to determining the unmapped node, packing the unmapped mode with an instruction having a gap.

8. A non-transitory, machine-readable medium, storing instructions, which when executed by a machine, causes the machine to execute operations comprising:
   reading operating code from a memory device;
   generating a first directed acyclic graph data structure from a portion of the operating code, the first directed acyclic graph data structure modeling a program flow of a first branch of a conditional statement of the operating code;
   generating a second directed acyclic graph data structure from the portion of the operating code, the second directed acyclic graph data structure modeling a program flow of a second branch of the conditional statement;
   initializing a scoring table data structure, the scoring table data structure comprising a plurality of columns based upon a number of nodes in the first directed acyclic graph data structure and a plurality of rows based upon a number of nodes in the second directed acyclic graph data structure;
   for a plurality of respective cells in the scoring table data structure corresponding to a particular node in the first directed acyclic graph data structure and a particular node in the second directed acyclic graph data structure, calculating a score based upon a scoring function, the scoring function using as input scores from one or more previously scored cells in the scoring table data structure corresponding to other nodes in the first and second directed acyclic graph data structures connected to the particular node in the first directed acyclic graph data structure and the particular node in the second directed acyclic graph data structure by at least one edge;
   storing, in the scoring table data structure, for each of the plurality of respective cells, an identifier of a mapping with a best score per incoming edge;
   determining a starting cell in the scoring table data structure for a backtrack procedure, the backtrack procedure tracing back from the cell with a highest score using the identifier of the mapping with the best score to produce a combined graph; and
   creating object code of the operating code based upon the combined graph, the object code configured, upon execution in a coarse grained reconfigurable array, to cause conditional execution of instructions in the operating code at a processing unit of the coarse grained reconfigurable array.

9. The non-transitory machine-readable medium of claim 8, wherein the operations of initializing the scoring table data structure comprises setting a first row and a first column of the scoring table data structure with a specified value.

10. The non-transitory machine-readable medium of claim 9, wherein the specified value is a negative value.

11. The non-transitory machine-readable medium of claim 8, wherein the scoring function is a maximum score of:
    a sum of a score of a first previous cell that represents a previous node that is connected in the first directed acyclic graph data structure to a first node in the first directed acyclic graph data structure and a second previous cell that represents a second previous node that is connected in the second directed acyclic graph data structure to a second node in the second directed acyclic graph data structure and a similarity score of the first and second nodes;
    a sum of the score of the first previous cell and a gap penalty; and
    a sum of the score of the second previous cell and the gap penalty.

12. The non-transitory machine-readable medium of claim 11, wherein the gap penalty increases for each successive gap.

13. The non-transitory machine-readable medium of claim 8, wherein the operations further comprise, causing execution of the object code on processors of a hybrid threading fabric (HTF).

14. The non-transitory machine-readable medium of claim 8, wherein the operations further comprise determining an unmapped node of the first directed acyclic graph data structure in the combined graph, and responsive to determining the unmapped node, packing the unmapped mode with an instruction having a gap.

15. A method for packing instructions, the method comprising:
    using a hardware processor: reading operating code from a memory device;
    generating a first directed acyclic graph data structure from a portion of the operating code, the first directed acyclic graph data structure modeling a program flow of a first branch of a conditional statement of the operating code;
    generating a second directed acyclic graph data structure from the portion of the operating code, the second directed acyclic graph data structure modeling a program flow of a second branch of the conditional statement;
    initializing a scoring table data structure, the scoring table data structure comprising a plurality of columns based upon a number of nodes in the first directed acyclic graph data structure and a plurality of rows based upon a number of nodes in the second directed acyclic graph data structure;
    for a plurality of respective cells in the scoring table data structure corresponding to a particular node in the first directed acyclic graph data structure and a particular node in the second directed acyclic graph data structure, calculating a score based upon a scoring function, the scoring function using as input scores from one or more previously scored cells in the scoring table data structure corresponding to other nodes in the first and second directed acyclic graph data structures connected to the particular node in the first directed acyclic graph data structure and the particular node in the second directed acyclic graph data structure by at least one edge;

storing, in the scoring table data structure, for each of the plurality of respective cells, an identifier of a mapping with a best score per incoming edge;

determining a starting cell in the scoring table data structure for a backtrack procedure, the backtrack procedure tracing back from the cell with a highest score using the identifier of the mapping with the best score to produce a combined graph; and creating object code of the operating code based upon the combined graph, the object code configured, upon execution in a coarse grained reconfigurable array, to cause conditional execution of instructions in the operating code at a processing unit of the coarse grained reconfigurable array.

16. The method of claim 15, wherein initializing the scoring table data structure comprises setting a first row and a first column of the scoring table data structure with a specified value.

17. The method of claim 16, wherein the specified value is a negative value.

18. The method of claim 15, wherein the scoring function is a maximum score of:

a sum of a score of a first previous cell that represents a previous node that is connected in the first directed acyclic graph data structure to a first node in the first directed acyclic graph data structure and a second previous cell that represents a second previous node that is connected in the second directed acyclic graph data structure to a second node in the second directed acyclic graph data structure and a similarity score of the first and second nodes;

a sum of the score of the first previous cell and a gap penalty; and a sum of the score of the second previous cell and the gap penalty.

19. The method of claim 18, wherein the gap penalty increases for each successive gap.

20. The method of claim 15, wherein the method further comprises causing execution of the object code on processors of a hybrid threading fabric (HTF).

* * * * *